United States Patent
Lincoln et al.

(10) Patent No.: US 9,906,328 B2
(45) Date of Patent: Feb. 27, 2018

(54) METHOD AND APPARATUS FOR DECODING A SIGNAL DISTORTED BY INTERFERENCE

(71) Applicant: Telefonaktiebolaget LM Ericsson (publ), Stockholm (SE)

(72) Inventors: Bo Lincoln, Lund (SE); Robert Mark Harrison, Grapevine, TX (US); George Jöngren, Sundbyberg (SE); Fredrik Nordström, Lund (SE); Stefania Sesia, Roquefort les Pins (FR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/308,650

(22) PCT Filed: Apr. 13, 2015

(86) PCT No.: PCT/SE2015/050431
§ 371 (c)(1),
(2) Date: Nov. 3, 2016

(87) PCT Pub. No.: WO2015/171041
PCT Pub. Date: Nov. 12, 2015

(65) Prior Publication Data
US 2017/0187493 A1  Jun. 29, 2017

Related U.S. Application Data

(60) Provisional application No. 61/990,997, filed on May 9, 2014.

(51) Int. Cl.
*H04B 1/00* (2006.01)
*H04L 1/06* (2006.01)
(Continued)

(52) U.S. Cl.
CPC ........ *H04L 1/0631* (2013.01); *H04J 11/0056* (2013.01); *H04L 1/0036* (2013.01)

(58) Field of Classification Search
CPC ...... H04L 5/0032; H04W 28/048; H04B 1/10; H04B 1/1027
(Continued)

(56) References Cited

U.S. PATENT DOCUMENTS

2013/0114438 A1* 5/2013 Bhattad ............... H04J 11/005
370/252
2013/0115987 A1  5/2013 Yoo et al.
2014/0307569 A1* 10/2014 Barbieri ............... H04L 5/0032
370/252

FOREIGN PATENT DOCUMENTS

EP  2568638 A1  3/2013

OTHER PUBLICATIONS

3GPP, "3rd Generation Partnership Project; Technical Specification Group Radio Access Network; Study on Network-Assisted Interference Cancellation and Suppression (NAIC) for LTE (Release 12)", 3GPP TR 36.866 V12.0.1, Mar. 2014, 1-64.
(Continued)

Primary Examiner — Lee Nguyen
(74) Attorney, Agent, or Firm — Murphy, Bilak & Homiller, PLLC

(57) ABSTRACT

A technology is disclosed for decoding a received signal at a wireless device. A first receiving process is performed comprising a decoding of the signal giving a first decoded result. It is determined if the first decoded result is correctly decoded. If so, the first decoded result is provided for downstream processing. If not, a second receiving process is performed comprising a decoding of the received signal for providing a second decoded result; and the second decoded result is provided for downstream processing. Further, either the first or second receiving process performs a blind
(Continued)

detection of the transmission properties of an interfering signal and performs an interference cancellation thereupon.

16 Claims, 15 Drawing Sheets

(51) Int. Cl.
    *H04J 11/00*     (2006.01)
    *H04L 1/00*     (2006.01)
    *H04B 7/00*     (2006.01)

(58) Field of Classification Search
    USPC .................................. 455/63.1, 67.11, 67.13
    See application file for complete search history.

(56) References Cited

OTHER PUBLICATIONS

Unknown, Author, "Discussion on broadcasting dynamic network assistance information", 3GPP TSG RAN WG1 Meeting #76, R1-140341, LG Electronics, Prague, Czech Republic, Feb. 10-14, 2014, 1-6.

Unknown, Author, "Discussion on network assistance information for enhanced IS/IC receivers", 3GPP TSG-RAN WG4 Meeting #68, R4-134356, Intel Corporation, Barcelona, Spain, Aug. 19-23, 2013, 1-6.

Unknown, Author, "Discussion on network assistance signalling for NAICS receivers", 3GPP TSG RAN WG1 Meeting #76, R1-140060, Huawei, HiSilicon, Prague, Czech Republic, Feb. 10-14, 2014, 1-6.

Unknown, Author, "Nokia Solutions and Networks Smart Scheduler", NSN White Paper, Feb. 2014, 1-16.

\* cited by examiner

METHOD AND APPARATUS FOR DECODING A SIGNAL DISTORTED BY INTERFERENCE

TECHNICAL FIELD

This disclosure relates to Interference cancellation (IC), and in particular to IC using assistance information.

BACKGROUND

Interference cancellation is crucial to the performance of User Equipment (UE) in wireless access network. In 3rd Generation Partnership Project (3GPP) Rel-12, Physical downlink shared channel (PDSCH) and (enhanced) Physical Downlink Control Channel ((e)PDCCH) cancellation is under development. How to cancel interference on PDSCH and (e)PDCCH is quite open.

In 3GPP, interference cancellation has been widely discussed. In Rel-11, Cell specific Reference Signal Interference Cancellation (CRS-IC), Primary Synchronization Signal (PSS)/Secondary Synchronization Signal (SSS), IC and Physical Broadcast CHannel (PBCH) IC has been standardized for heterogeneous networks. To enhance User Equipment (UE) performance, PDSCH and PDCCH/ePDCCH IC are under discussion in Rel-12. In Rel-11, in order to enable CRS-IC, PSS/SSS, and PBCH IC, an evolved Node B (eNB) needs to provide certain assistance information, including CRS ports, cell ID, and Multimedia Broadcast multicast service Single Frequency Network (MBSFN) configuration. A UE utilizes this information to cancel interference from CRS, PSS/SSS and PBCH. In Rel-12, how to enhance UE performance by interference cancellation from data channels has not been determined.

A brief introduction of terminology used throughout the specifications is presented here. The term Serving Cell (SC) is understood to encompass the cell to which the UE is currently attached, and Neighbouring Cell (NC) is understood to encompass a cell or transmission points where the transmission of data is typically interfering with the reception of data from the SC. Interference Cancellation (IC) is understood to encompass regeneration and subtraction of interfering data or control signalling from the desired received signal. Typical types of IC are soft IC and hard IC, which are discussed below, but IC receivers also include maximum likelihood (ML) type receivers. Unless otherwise noted, any reference to an "IC receiver" or "IC processing" herein shall be understood as referring to some type of assisted-mode processing. A baseline receiver is here understood to refer to a receiver that does not use assisted-mode interference cancellation and may be, for example, a "legacy" Rel-11 receiver using e.g. Linear Minimum Mean Square Error (LMMSE)-IRC processing.

A Network-Assisted Interference Cancelation and Suppression (NAICS) receiver is understood to encompass an interference cancellation or suppression capable receiver that can be one of several types discussed below, and which operates in assisted mode and thus uses assistance information for interference cancellation. An assisted-mode receiver is here understood to represent a NAICS receiver, or other such receiver, that uses assistance information to cancel or suppress interference for one or more interfering signals in a received signal. A non-assisted mode receiver is here understood to represent a receiver that may (but not necessarily does) perform interference cancellation, but does so without using assistance information.

For network-assisted interference cancellation and suppression, different interference mitigation methods can be used. Two kinds of IC methods are extensively discussed. One is Symbol Level Interference Cancelation (SLIC), and the other is CodeWord level Interference Cancelation (CWIC). For symbol level interference cancellation, the interference signal is regenerated after demodulation and further subtracted from the receiving signal. For code word level interference cancellation, the interference signal is synthesized after channel decoding, and further subtracted from the receiving signal. The main interference suppression method that has been discussed is Enhanced-IRC, which is an IRC receiver where the interference covariance matrix is parametrically built. There is also a fourth interference mitigation algorithm that has been studied, which is the Maximum Likelihood (ML) receiver, where the best modulation symbol is found according to a given interference distribution.

Quite common for any kind of effective interference cancellation algorithm is that it is a soft IC. This means that it will take the certainty of a certain symbol value, or parameter value into account when determining how to regenerate and cancel the transmitted information. For example, when there is a lot of interference or noise on the data stream to be cancelled, the quality of demodulation and/or decoding can be expected to be low, and then typically the regenerated data symbols are created with lower energy to only cancel the certain part of the symbol and not introduce a lot of additional errors. If this is done correctly, then soft IC should never introduce additional errors or interference in the cancellation step.

Unfortunately, as discussed below, there are always cases where the soft IC algorithm is unaware of uncertainty or parameter errors and therefore cannot avoid errors. The soft IC is a generalization of the hard IC, where in the latter symbol regeneration is limited to the set of transmitted modulation symbols. In the following discussion we will only use the more general soft IC, but it can easily be translated also to the hard IC case.

The ML receiver is another kind of hard decision interference mitigation algorithm which also has a soft counterpart. For ML, the hard decision is made over several layers at once. Similar arguments discussed for soft IC also hold for ML receiver, hence in the following discussion about drawbacks for soft IC will also hold for ML receiver. CRS IC is a specific version of hard IC, where the regenerated symbol is only regenerated to already the known symbol value of the pilot.

To facilitate the interference estimation and regeneration at the UE side, firstly, a network provides to the UEs information about transmission properties of interfering signals so that the UEs can estimate channel status of the interferers that are intended to be cancelled. Secondly, depending on the UE's capability, the structure of interfering signals, such as modulation style/feature (for instance modulation order), may be needed to be known to the UE. Additional information on this interference signal structure, including the consistency of the structure during a size of scheduling resource granularity, can aid the UE to efficiently estimate and synthesize the interfering signal with a low complexity, which is a critical factor for standardization and product's business value.

In short, network assistance is preferably to provide information about the interferers, including any information aiding the UEs to infer interfering channel status and information on the structure or features of the interfering signal.

Network assistance always comes with a cost to the system, since it consumes valuable system resource when being transmitted to the receiver. Therefore, it is expected that a NAICS receiver will have to blindly detect, i.e. estimate one or more transmission parameters based on received signal properties, quite a few of the NC parameters, often based on statistics on the received data signal.

The typical processing steps of a NAICS receiver using blind detection and IC is shown in FIG. 1, which shows the typical processing steps of a NAICS receiver using IC and blind detection. Here, to select the best decoding result encompasses picking a decoding result with a Cyclic Redundancy Check (CRC) that indicates no data corruption.

A typical IC receiver takes information on Signal-to-Interference-plus-Noise Ratio (SINR) levels into account when cancelling data in order to avoid hard decisions that add interference rather than reducing it. As long as the receiver has correct information about the current noise level and NC parameters, this IC can be done essentially without loss in any case. This is shown in FIG. 2, showing the cancellation efficiency (fraction of cancelled interfering energy) versus the Signal-to-Noise-Ratio (SNR) when the receiver has perfect knowledge about the NC channel, noise level, modulation and other parameters. As can be noted, there is almost no instances of negative CE, i.e. increased interference rather than reduced.

In practice, though, the receiver will have to rely in estimated data both for channel and noise level as well as for other NC parameters such as modulation. In FIG. 3 and FIG. 4, two examples of the impact of errors in this estimation are shown. This can lead to worse performance in the receiver with a NAICS receiver than in the baseline receiver at certain operating points. This can also easily be verified in simulations. For example, when the quality of channel estimates is too low or when blind detection of NC parameters fail, the IC performance is quite often worse than for the baseline receiver.

FIG. 3 shows the cancellation efficiency when 16QAM is assumed on the NC in all cases, but the real NC modulation is as defined in the legend. For 16QAM and 64QAM, this works fine, but for QPSK it actually adds significant interference (negative CE) around SNR 10 dB. FIG. 4 shows the CE when the SNR estimate in the receiver is optimistic and has a scaling error of 0.5 (−3 dB). It should be noted that interference created by the IC is added around the 0 dB region.

SUMMARY

It is therefore an object to address the technical challenges outlined above, and to avoid loss of performance and reduce power consumption for a wireless device or UE capable of IC based on blindly detected assistance information. This object and others are achieved by the method, and the wireless device according to the independent claims, and by the embodiments according to the dependent claims.

In accordance with a first aspect, a method of decoding a received signal at a wireless device operating in a wireless communication network is provided. The method comprises: (i) performing a first receiving process and the receiving processes comprises: performing a decoding of the received signal for providing a first decoded result. The method further comprises: (ii) determining if the first decoded result is correctly decoded, and if it is determined that the first decoded result is correctly decoded, the method further comprises: (iii) providing the first decoded result for downstream processing. If it is determined that the first decoded result is not correctly decoded, the method further comprises: (iv) performing a second receiving process comprising: performing a decoding of the received signal for providing a second decoded result, and (v) providing the second decoded result for downstream processing. The first receiving process or the second receiving process comprises prior to performing the decoding: estimating transmission properties of an interfering signal by blind detection, and performing an interference cancellation from the received signal based on the estimated transmission properties.

The transmission properties that are estimated in the blind detection may deviate from the real ones. This may introduce an error in the interference cancellation, which is based on the transmission properties. This in turn may introduce an error that is present in the received signal after decoding, as described above. In this scenario, if the interference cancellation is performed in the first receiving process, and if it is determined that the first decoded result is not correctly decoded, the second receiving process is performed without interference cancellation. Thus, the resulting second decoded result is not affected by the above described error caused by the blind detection and a loss of performance is avoided. Further, baseline performance is achieved or guaranteed by the second receiving process.

In another scenario, interference may result in that a received signal is not correctly decoded. Then, if interference cancellation is not performed in the first receiving process, it will be determined that if the first decoded result is not correctly decoded, and the second second receiving process will be performed involving interference cancellation and with a resulting second decoded result that is more likely to be correctly decoded. This way, the performance of the wireless device is improved.

The method of the first aspect may further comprise, prior to performing the first receiving process: determining if the interference cancellation is to be performed in the first receiving process based on an expected performance gain of the interference cancellation. The interference cancellation may be performed in the first receiving process if a performance gain is expected. The interference cancellation may be performed in the second receiving process if a performance gain is not expected. This way, interference cancellation may be avoided without loss of performance, and the power consumption of the wireless device may be reduced.

In accordance with a second aspect, a wireless device configured to operate and receive a signal in a wireless communication network is provided. The wireless device is further configured to: (i) perform a first receiving process comprising: performing a decoding of the received signal for providing a first decoded result. The wireless device is further configured to: (ii) determine if the first decoded result is correctly decoded, and to (iii) provide the first decoded result for downstream processing if it is determined that the first decoded result is correctly decoded. Otherwise, if it is determined that the first decoded result is not correctly decoded, the wireless device is configured to: (iv) perform a second receiving process comprising: performing a decoding of the received signal for providing a second decoded result, and (v) provide the second decoded result for downstream processing. The first receiving process or the second receiving process further comprises prior to performing the decoding: estimating transmission properties of an interfering signal by blind detection, and performing an interference cancellation from the received signal based on the transmission properties.

The wireless device may further be configured to, prior to performing the first receiving process: determine if the interference cancellation is to be performed in the first receiving process based on an expected performance gain of the interference cancellation.

The different features of the wireless device have the same effects and advantages as the corresponding features of the method according to the first aspect.

The present invention is not limited to the above features and advantages. Those of ordinary skill in the art will recognize additional features and advantages upon reading the following detailed description, and upon viewing the accompanying drawings.

DETAILED DESCRIPTION

In the following, the different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Figure 1:
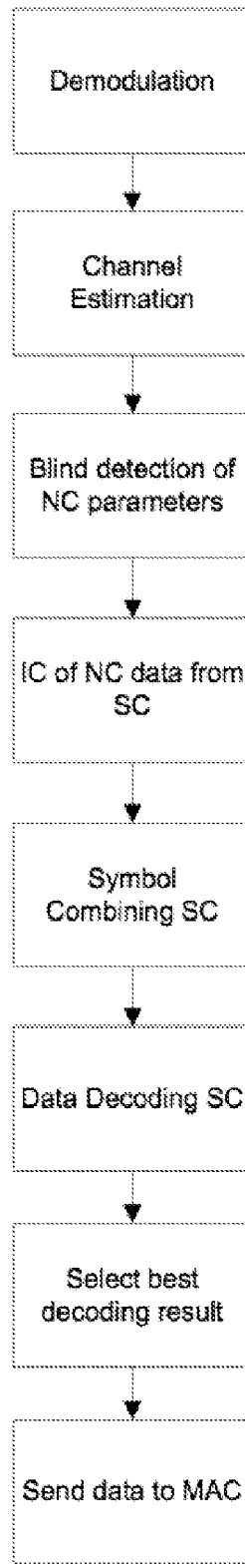
FIG. 1 is a block diagram of operations in a Network-Assisted Interference Cancelation and Suppression (NAICS) receiver.
Figure 2:
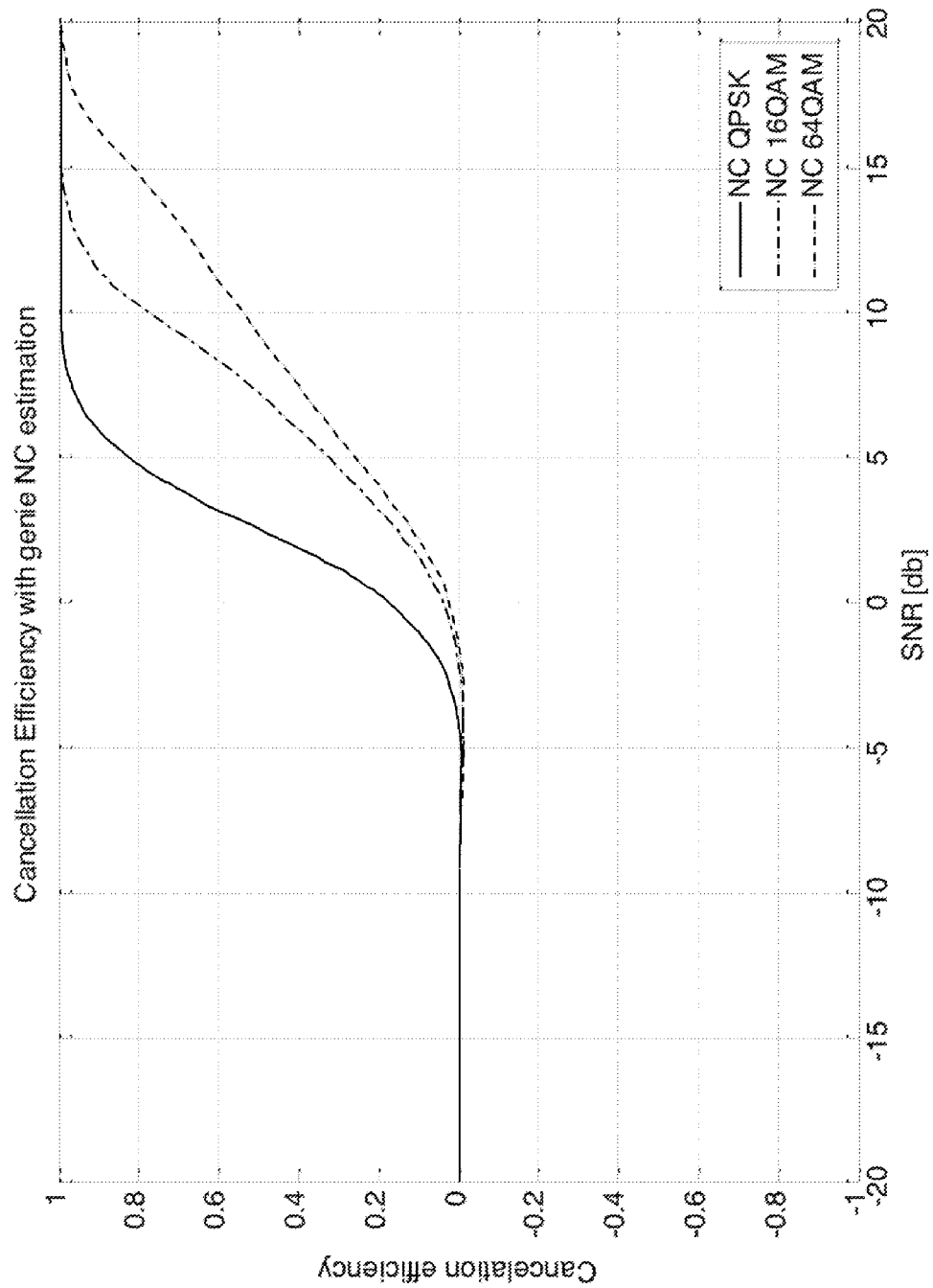
FIGS. 2-4 are plots of the interference cancellation and suppression efficiency of an NAICS receiver in different scenarios.
Figure 3:
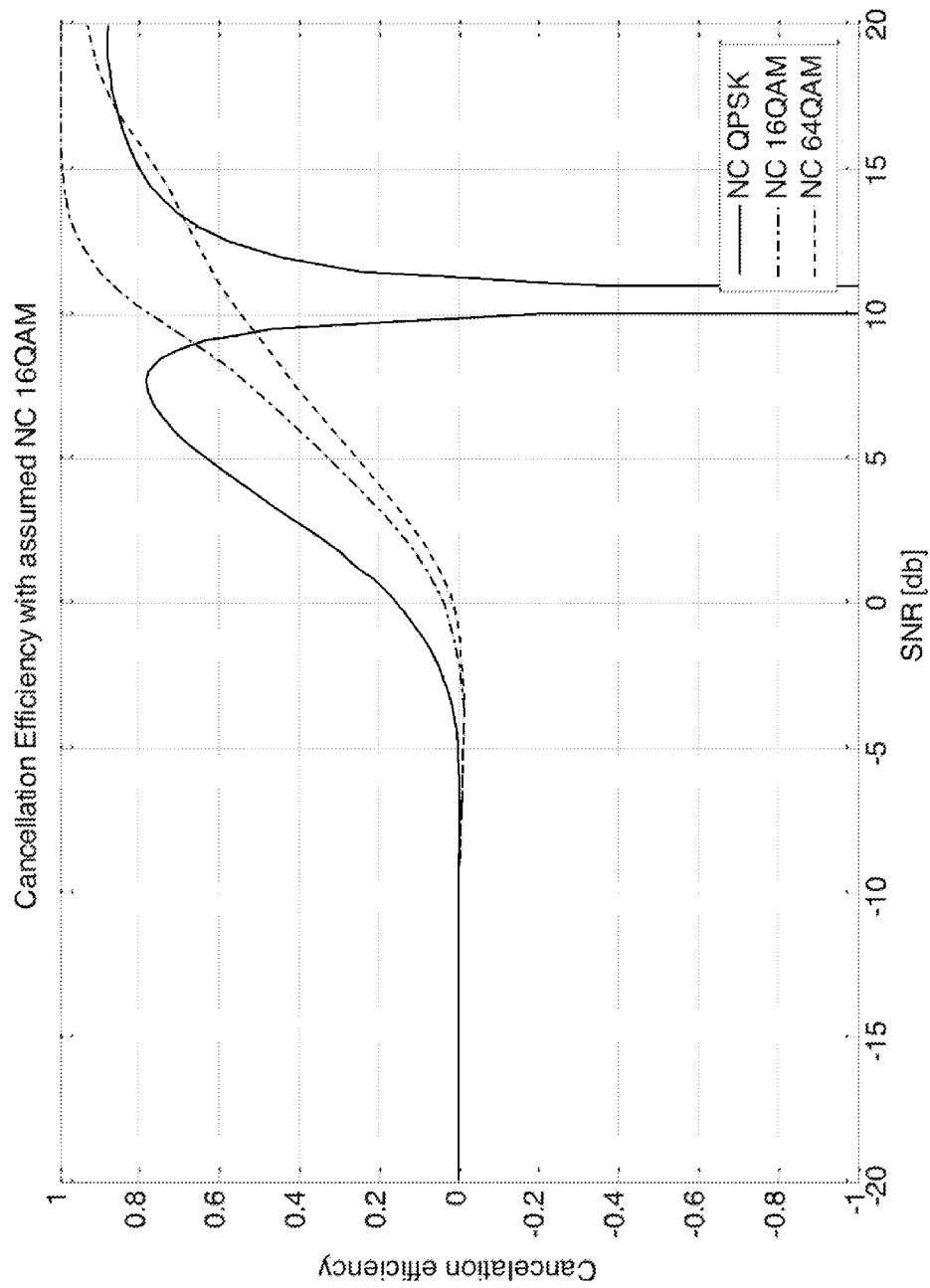
Figure 4:
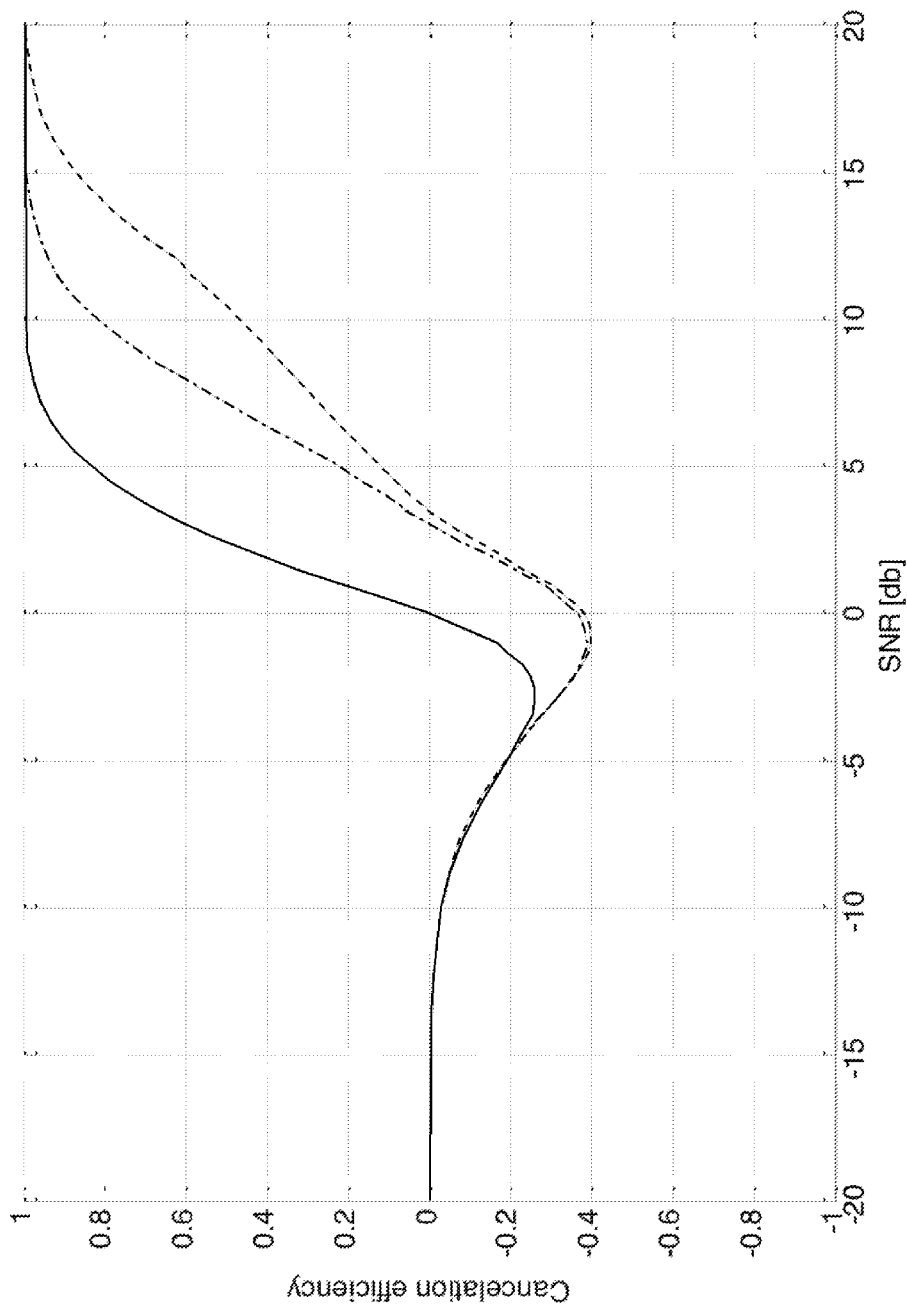
Figure 5:
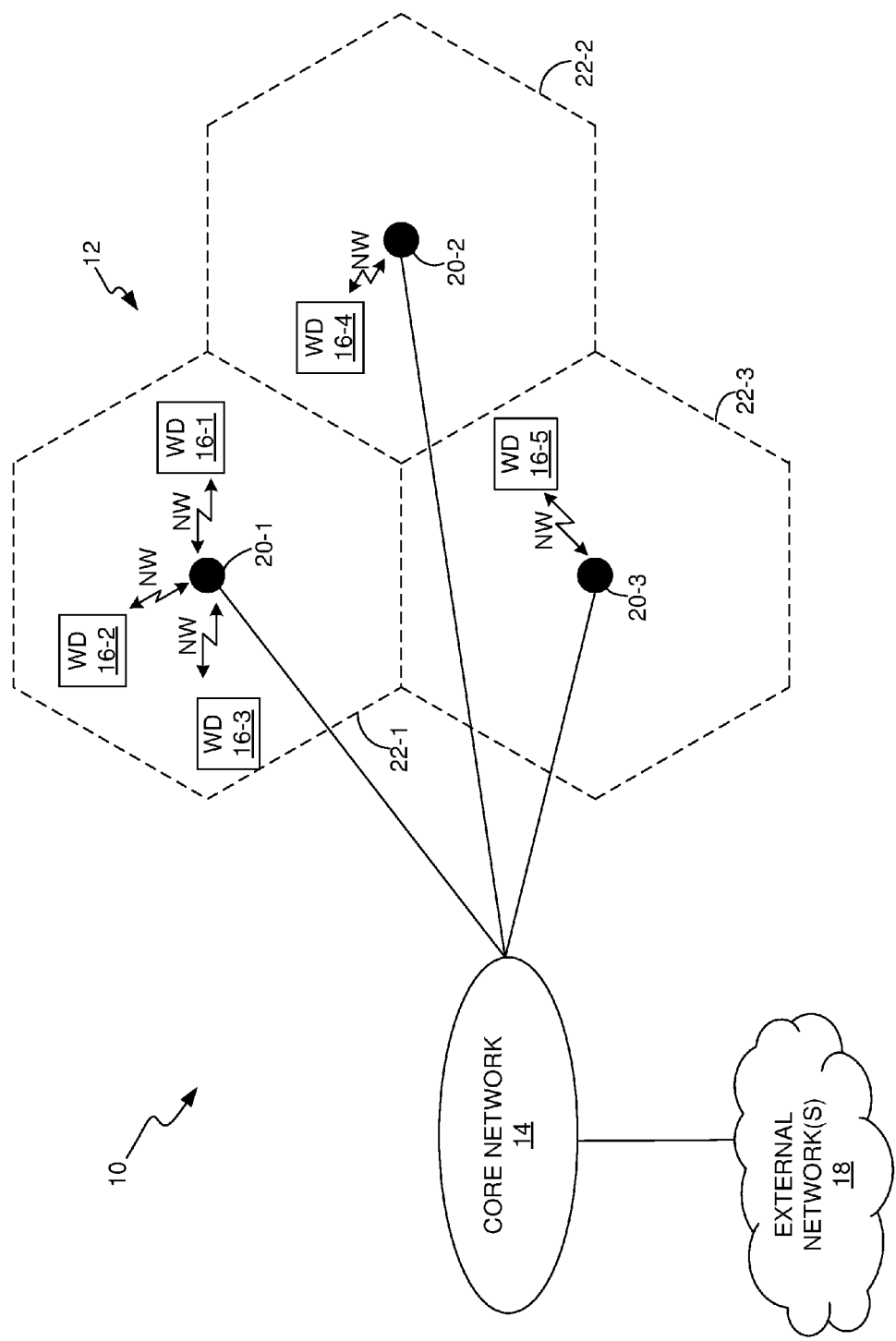
FIG. 5 is a block diagram of one embodiment of a wireless communication network in which one or more nodes are configured according to the teachings herein.

FIG. 5 illustrates an example wireless communication network 10 that includes a Radio Access Network (RAN) 12 and a Core Network (CN) 14. The network 10 communicatively couples wireless devices 16 to one or more external networks 18, such as the Internet or another packet data network. The diagram is simplified for ease of discussion and it will be appreciated that the network 10 may include additional examples of any one or more of the illustrated entities and may include other entities not illustrated. For example, the CN 14 may include Mobility Management Entities (MMEs), Serving Gateways or SGWs, a Packet Gateway or PGW, and one or more other nodes, such as positioning nodes, O&M nodes, etc.

The RAN 12 includes a number of base stations 20-1, 20-2 and 20-3, which in the Long Term Evolution (LTE) context are referred to as eNBs or eNodeBs. Unless suffixes are needed for clarity, the reference number "20" will be used to refer to base stations in the singular and plural sense. Each base station 20 uses certain air interface resources— e.g., spectrum, carriers, channels, etc.—to provide service over a given area, referred to as a "cell." Accordingly, in FIG. 5, the base station 20-1 provides a cell 22-1, the base station 20-2 provides a cell 22-2, and the base station 20-3 provides a cell 22-3. Unless suffixes are needed for clarity, the reference number "22" will be used herein to refer to cells in the singular and plural sense.

Any of the base stations 20 may provide more than one cell 22, e.g., in the case of multi-carrier operation, and the teachings herein are not limited to arrangement of base stations 20 and cells 22 depicted in FIG. 5. For example, the cell sizes may be adaptive or non-uniform. In one example of the latter case, the network 10 comprises a heterogeneous network where one or more large cells, referred to as "macro" cells are overlaid by one or more smaller cells, referred to as "micro," "pica," or "femto," cells. These smaller cells are provided by low-power access points and may be used as service hotspots that provide higher data rate services and/or may be used to extend or fill in the service coverage provided by the macro cells. In some heterogeneous deployments, the micro cells use the same radio access technology used by the macro cells, e.g., LTE-based micro cells overlaying LTE-based macro cells.

According to the teachings herein, one or more of the base stations 20 is configured to receive and process a signal or other indication from a wireless device 16, indicating the type(s) of receiver processing used or in use at the wireless device 16. In one example, the base station 20 or another node in the network 10 is further configured to decide whether a wireless device 16 should be restricted from using a particular type of receiver processing, or should be directed to use a particular type of receiver processing, and to send signalling indicating such decisions.

By way of example, a given one of the wireless devices 16 is configured with at least first and second receiver processes, which processes can be used in the alternative, in series, or in parallel. Correspondingly, the wireless device 16 can obtain decoding results for a received signal using the first receiver process, using the second receiver process, or using both receiver processes. The first and second receiver processes are distinguished in terms of their interference-related processing. In particular, the first receiver process is an "assisted-mode" process in which the wireless device 16 uses "assistance information" to perform interference cancellation. (Unless noted, the term "interference cancellation" broadly denotes cancellation and/or suppression.) In contrast, the second receiver process does not use assistance information to perform interference cancellation. Indeed, the second receiver process may not perform interference cancellation but in one or more embodiments does implement at least some form of interference rejection.

Thus, in some embodiments herein, a base station 20 or another network node is configured to receive an indication from a wireless device 16 and determine from that indication whether or not the wireless device is using (or did use) assisted-mode or non-assisted mode received-signal processing. Additionally, or alternatively, the base station 20 or other network node may be configured to send signalling for the wireless device 16, to control whether or when it uses one or both such modes.

Figure 6:
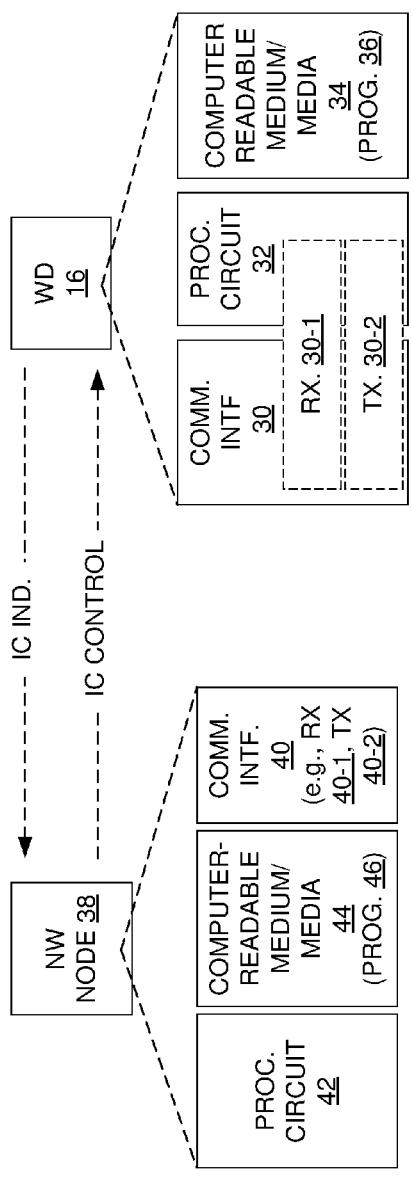
FIG. 6 is a block diagram of one embodiment of a network node, such as a radio base station, and one embodiment of a wireless device configured for operation in a wireless communication network.

Consider FIG. 6, which shows an example embodiment of a wireless device 16 that includes a communication interface 30, including a receiver 30-1 and a transmitter 30-2, along with a processing circuit 32 and an associated computer-readable medium (or media) 34. The computer-readable medium 34 stores a computer program 36 in one or more embodiments, and may further store provisioning and/or configuration information. The receiver 30-1 and 30-2 are shown as bridging the communication interface 30 and processing circuit 32 merely to indicate that certain aspects of receive and transmit processing may be performed using baseband digital processing functions implemented in the processing circuit 32, while the communication interface 30 itself at least provides analog-domain received signal and transmit signal circuitry.

FIG. 6 further illustrates an example network node 38—which may be a base station 20—as including a communication interface 40 having a receiver 40-1 and a transmitter 40-2, a processing circuit 42, and an associated computer-readable medium (or media) 44. The computer-readable medium 44 stores a computer program 46 in one or more embodiments, and may further store provisioning and/or configuration information. For example, the network node 38 is configured according to the teachings herein related to detecting and/or controlling whether or when the wireless device 16 operates in the assisted- and non-assisted modes. This configuration may be implemented at least in part via execution by the processing circuit 42 of computer program instructions included in the computer program 46. More generally, it will be appreciated that the network node 38 comprises fixed processing circuitry, programmed processing circuitry, or a mix of both.

As for the example wireless device 16, it is configured for operation in a wireless communication network, e.g., the network 10. The wireless device 16 may be a cellular radiotelephone (smartphone, feature phone, etc.), a tablet or laptop computer, a network adaptor, card, modem or other such interface device, or essential device or other apparatus that is configured for wireless communication in the network 10. In the 3GPP context, the wireless device 16 is referred to as a UE and the communication interface 30 will be understood as a communication transceiver that includes radio frequency receiver circuitry as said receiver 30-1 and radio frequency transmitter circuitry as said transmitter 30-2. This circuitry and the overall wireless device 16 are configured for network communications according to the applicable network communication protocols.

The communication interface 30 may include a mix of analog and digital circuits. For example, the receiver 30-1 in one or more embodiments comprises front-end and pre-processing circuitry (not explicitly shown in FIG. 6) that generates one or more streams of digital signal samples corresponding to antenna-received signals, and further includes one or more receiver processing circuits—e.g., baseband digital processing circuitry and associated buffer memory—which operate on the digital samples. Example operations include linearization or other channel compensation, possibly with interference rejection, and symbol demodulation/detection.

The wireless device 12-1 further includes a processing circuit 32 that is operatively associated with the communication interface 30, and which may provide baseband-processing functions associated with the communication interface 30. The processing circuit 32 further includes or is associated with the computer-readable medium (or media) 34. The computer-readable medium 34 comprises, for example, a mix of volatile, working memory and non-volatile configuration and program memory. Non-limiting examples of the former include Static RAM or SRAM, while non-limiting examples of the latter include FLASH, EEPROM, and SSD storage.

In at least some embodiments, the processing circuit 32 provides digital baseband processing for the signals received and transmitted through the communication interface 30. The processing circuit 32 in this regard comprises digital processing circuitry and may be implemented as one or more microprocessors, DSPs, ASICs, FPGAs, etc. More generally, the processing circuit 32 may be implemented using fixed circuitry or programmed circuitry, or a mix of both. In an example embodiment, the computer-readable medium 34 stores a computer program 36. The processing circuit 32 in such embodiments is at least partly configured according to the teachings herein, based on its execution of the computer program instructions comprising the computer program 36.

Figure 7:
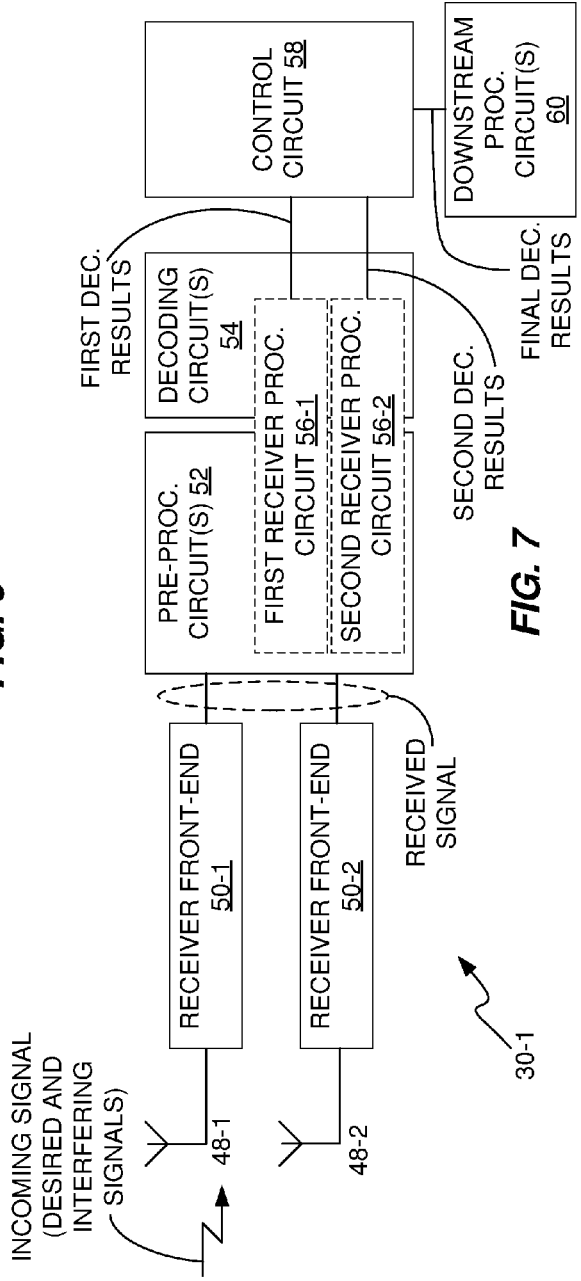
FIG. 7 is a block diagram of example receiver circuitry for a wireless device according to one embodiment.

FIG. 7 provides further example details. One sees that the wireless device 16 includes two or more receiver antennas 48 (with antennas 48-1 and 48-2 shown by way of non-limiting example). The wireless device 16 includes receiver front-end circuits 50 corresponding to its multiple receiver antennas 48 (with receiver front-end circuits 50-1 and 50-2 shown by way of non-limiting example). The receiver front-end circuits 50 provide frequency conversion, filtering and amplification as needed or appropriate, along with digitization and provide pre-processing circuits 52 with digital sample streams corresponding to the antenna-received incoming signal(s). In turn, the pre-processing circuits 52 provide decoding circuit(s) 54 with symbol detection statistics or other such information for use in decoding at least the desired signal portions of the received signal. Here, each antenna-received signal will be understood as including one or more desired signals or signal components, and, generally, one or more interfering signals or signal components, along with noise. However, it may be that only one or a small number of interferers are dominant at any given reception time of interest.

The pre-processing circuits 52 and/or the decoding circuits 54 are arranged to implement a first receiver circuit 56-1 and a second receiver circuit 56-2. The two circuits 56-1 and 56-2 are distinguished in that the first decoding results obtained from operation of the first receiver circuit 56-1 are obtained using "assisted mode" interference cancellation, while the second decoding obtained from operation of the second receiver circuit 56-2 are not obtained using assisted mode interference cancellation. In this regard, the distinctions may be manifested in the pre-processing and/or decoding aspects of first and second receiver processes respectively implemented by the first and second receiver circuits 56-1 and 56-2.

In general, the pre-processing circuits 52 provide demodulation (symbol detection), channel estimation, etc., and provide the decoding circuit(s) 54 with the symbol detection values, etc., as needed to perform received-signal decoding. Again, the overall arrangement may be regarded as providing a first receiver process to obtain decoding results using assisted mode interference cancellation and a second receiver process to obtain decoding results for the same received signal(s), where the second receiver process does not use assisted mode interference cancellation.

In this regard, the second receiver process defines a performance baseline against which assisted-mode interference cancellation performance can be evaluated. For example, when the assistance information is incomplete or inaccurate, the first receiver process may perform worse than the second receiver process. Here, the "worse performance" of the first receiver process can be seen, e.g., in the decoding results, such as where there is a higher incidence of decoding failure in the decoding results produced by the first receiver process. Worse performance might arise in the case of incorrect or incomplete assistance information being used to generate interfering signal estimates which are then used in the first receiver process to suppress interference in the received signal, for use in generating symbol detection information for decoding. Of course, the second receiver process may employ some form or type of interference cancellation in the pre-processing and/or decoding steps, but such operations critically do not use the assistance information.

Here, it will be understood that the decoding circuits 54 may operate on, e.g., buffered portions or segments of the received signal, e.g., on received code words or other defined blocks or packets of data. In any case, the control circuit 58 receives first decoding results obtained via the first receiver process and receives second decoding results obtained via the second receiver process, for the same received signal, e.g., for the same code word(s) or other blocks or segments of the received signal. The control circuit 58 provides final decoding results to one or more downstream processing circuits 58—e.g., higher-layer processing circuits that act on or use the recovered data.

Thus, with the above in mind, an example wireless device 16 includes a communication interface (e.g. a transceiver) 30 comprising a receiver 30-1 configured to receive signals from a wireless communication network 10 and a transmitter 30-2 configured to transmit signals to the wireless communication network 10. The receiver 30-1 includes a first receiver circuit 56-1 configured to obtain first decoding results by processing a received signal using a first receiver process that cancels interference in the received signal based on knowledge of interfering-signal transmission properties. Here, that knowledge is represented by assistance information received from the network 10 and/or blindly estimated by the wireless device 16.

The receiver 30-1 further includes a second receiver circuit 56-2 that is configured to obtain second decoding results by processing the received signal using a second receiver process that does not cancel interference in the received signal based on said knowledge of interfering-signal transmission properties. The second receiver process thereby establishes a performance baseline for evaluating the decoding performance of the first receiver process. Put another way, the first receiver process uses assistance information to cancel interference in the received signal, while the second receiver process does not use the assistance information to cancel interference in the received signal.

To guarantee that the receiver 30-1 always achieves at least the baseline performance represented by the second receiver process, the control circuit 58 is configured to form final decoding results as any one: of the first decoding results, the second decoding results, or a combination of the first and second decoding results. The control circuit 58 is further configured to provide the final decoding results to downstream processing circuitry 60, for downstream received-signal processing.

In some embodiments, the control circuit 58 and at least a portion of the first and second receiver circuits 56-1 and 56-2 are comprised in the processing circuit 32, which may be a Digital Signal Processor (DSP), for example. Also as noted, the receiver 30-1 is configured as a multi-antenna receiver, and, in at least one embodiment, the processing circuit 32 is a baseband processing circuit coupled to two or more receiver front-end circuits 52, each front-end circuit 52 corresponding to a different receiver antenna 48.

Figure 8:
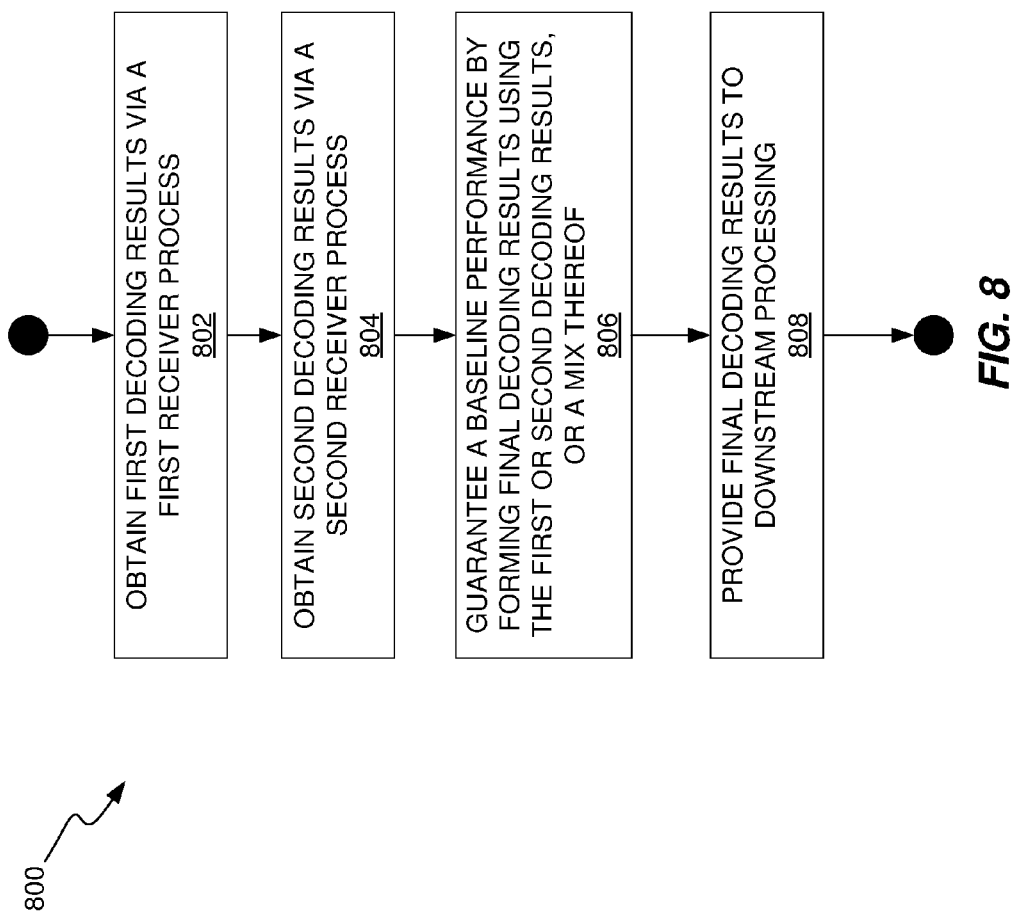
FIG. 8 is a logic flow diagram of one embodiment of a method of received-signal at wireless device.

Independent of the particular functional and/or physical implementation details suggested by FIGS. 6 and 7 for the example wireless device 16, it is contemplated herein that a wireless device 16 is configured to perform a method of received-signal processing using assisted and non-assisted modes of received-signal processing. FIG. 8 illustrates one embodiment of such a method 800.

The method 800 provides for decoding a received signal at a wireless device 16 operating in a wireless communication network 10. The method includes obtaining (Block 802) first decoding results by processing a received signal using a first receiver process that cancels interference in the received signal based on knowledge of interfering-signal transmission properties, said knowledge represented by assistance information received from the network and/or blindly estimated by the wireless device 16. The method 800 further includes obtaining (Block 804) second decoding results by processing the received signal using a second receiver process that does not cancel interference in the received signal based on said knowledge of interfering-signal transmission properties and thereby establishes a performance baseline for evaluating a decoding performance of the first receiver process.

The method 800 further includes forming (Block 806) final decoding results as any one of the first decoding results, the second decoding results, or a combination of the first and second decoding results, and thereby guaranteeing that the final decoding results at least meet the performance baseline. Further, the method 800 includes providing (Block 808) the final decoding results for downstream received-signal processing.

In some embodiments, obtaining the first decoding results comprises processing the received signal in a first receiver circuit 56-1 that is configured to carry out the first receiver process, and wherein obtaining the second decoding results comprises processing the received signal in a second receiver circuit that is configured to carry out the second receiver process. Here, each receiver process includes received symbol detection and channel estimation operations, at least some of which may be shared or in common between the first and second receiver processes.

In some embodiments, carrying out the first receiver process includes obtaining the assistance information at least partly based on blindly estimating one or more of the interfering-signal transmission properties used for interference cancellation.

In some embodiments, the first receiver process comprises a plurality of first receiver processes that are performed in series or parallel. Each such first receiver process produces a first decoding result set and corresponds to a different hypothesis for the interfering-signal transmission properties. For example, the receiver 30-1 may make multiple assumptions regarding one or more elements of the assistance information—e.g., different assumptions regarding the Modulation and Coding Scheme of an interfering signal and/or different assumptions regarding the transport format, block size, etc. Each such assumption or combination of assumptions represents a different interference hypothesis, so each first decoding result set represents the decoding results corresponding to a different interference hypothesis.

In any case, such embodiments of the method 800 include forming the final decoding results based on selecting the final decoding results as any one of: the second decoding results, any one of the first decoding result sets, any mix of the first decoding result sets, and any mix of the second decoding results and any one or more of first decoding result sets. Such operations ensure that the "best" decoding results are provided as the final decoding results, whether those best results represent the results from a specific one of the receiver processes, or a mix of results from two or more of those processes.

Broadly, the first decoding results comprise first decoded data values, the second decoding results comprise second decoded data values, and any one of the following applies: the first decoding results are taken as the final decoding results if no decoding errors are detected for the first decoding results; the second decoding results are taken as the final decoding results if no decoding errors are detected for the second decoding results; or correctly-decoded results from the first and second decoding results are aggregated to form the final decoding results.

The method 800 may also include dynamically changing the wireless device 16 between a first mode of operation wherein it performs any of the steps set forth in the above descriptions of the method 800, and a second mode of operation wherein it does not perform the first receiver process or otherwise does not use the first decoding results, such that the final decoding results are the second decoding results. In other words, at times the wireless device 16 may not use decoding results obtained from assisted-mode receiver processing. The network may signal such a decision to the device 16 or the device may take the decision autonomously, e.g., based on the unavailability of assistance information (either because the network is not providing it or because blind detection is not desired or is not possible).

In further examples, with the above modal switching, the method 800 in one or more embodiments includes choosing between the first mode and the second mode based on any one or more of the following: control signalling received from the network, the presence or absence of Almost Blank Subframes (ABS) in the received signal, whether or not the network provides one or more elements of the assistance information which are considered as being critical assistance parameters, the ability to blindly estimate sufficient assistance information and/or the availability of sufficient assistance information from the network, received signal quality and/or strength, interference power, the presence or absence of one or more dominant interfering signals in the received signal, and reception and/or transmission modes.

As for the assistance information, it is received in whole or in part from the network 10, or is blindly estimated in whole or in part by the wireless device 16. The assistance information can be understood as representing knowledge of one or more "transmission properties" regarding transmit-side signal structure, format, power, etc., for an interfering signal. Examples include Modulation and Coding Scheme (MCS), transport format or block size, transmit power or power ratio, etc. The assistance information is used, e.g., in regenerating an estimate of the interfering signal(s) and using the regenerated signals to suppress corresponding interference in received signal.

The second receiver process obtains second decoding results by decoding the received signal using a second receiver process that does not cancel interference in the received signal based on assistance information and thus operates as "non-assisted mode" processing that establishes a performance baseline for evaluating the decoding performance of the (assisted mode) first receiver process. Of course, the second receiver process may perform some form of interference cancellation or at least some form of interference suppression or rejection.

In one example, the second receiver process is the Linear Minimum Mean Square Error (LMMSE) Interference Rejection Combining (IRC) process specified in the Release 11 Technical Specifications (TS) promulgated by the Third Generation Partnership Project (3GPP), for Long Term Evolution (LTE) communication networks. However, in contrast with respect to the first receiver process, the second receiver process does not receive and/or blindly estimate one or more transmit-signal properties of the interfering signal(s) to be suppressed. Instead, for example, interference rejection is achieved by generating one or more noise and impairment covariance matrices that reflect the correlation of noise and impairment across, e.g., receiver antennas, and performing linear combining using weights determined from the covariance matrices.

Without loss of generality, the first receiver process may be referred to as a NAICS process and the first receiver circuit 56-1 may be referred to as a NAICS receiver. Here, the NAICS label is a convenient reference for assisted-mode interference cancellation and covers the case where the network 10 actually provides at least some of the assistance information used for interference cancellation, and additionally covers the case where the wireless device 16 blindly estimates any or all of the assistance information.

The blind detection procedure of any parametric NAICS receiver has a certain degree of accuracy depending on the current circumstances, such as SINR level, number of interferers, rank of interferers etc. Also, IC depends a lot on the estimation quality of the SC and NC channel(s) as well as noise covariance. Typically, IC algorithms are quite sensitive to errors in the estimates and will introduce additional interference if the errors are too large, as indicated earlier herein.

Figure 9:
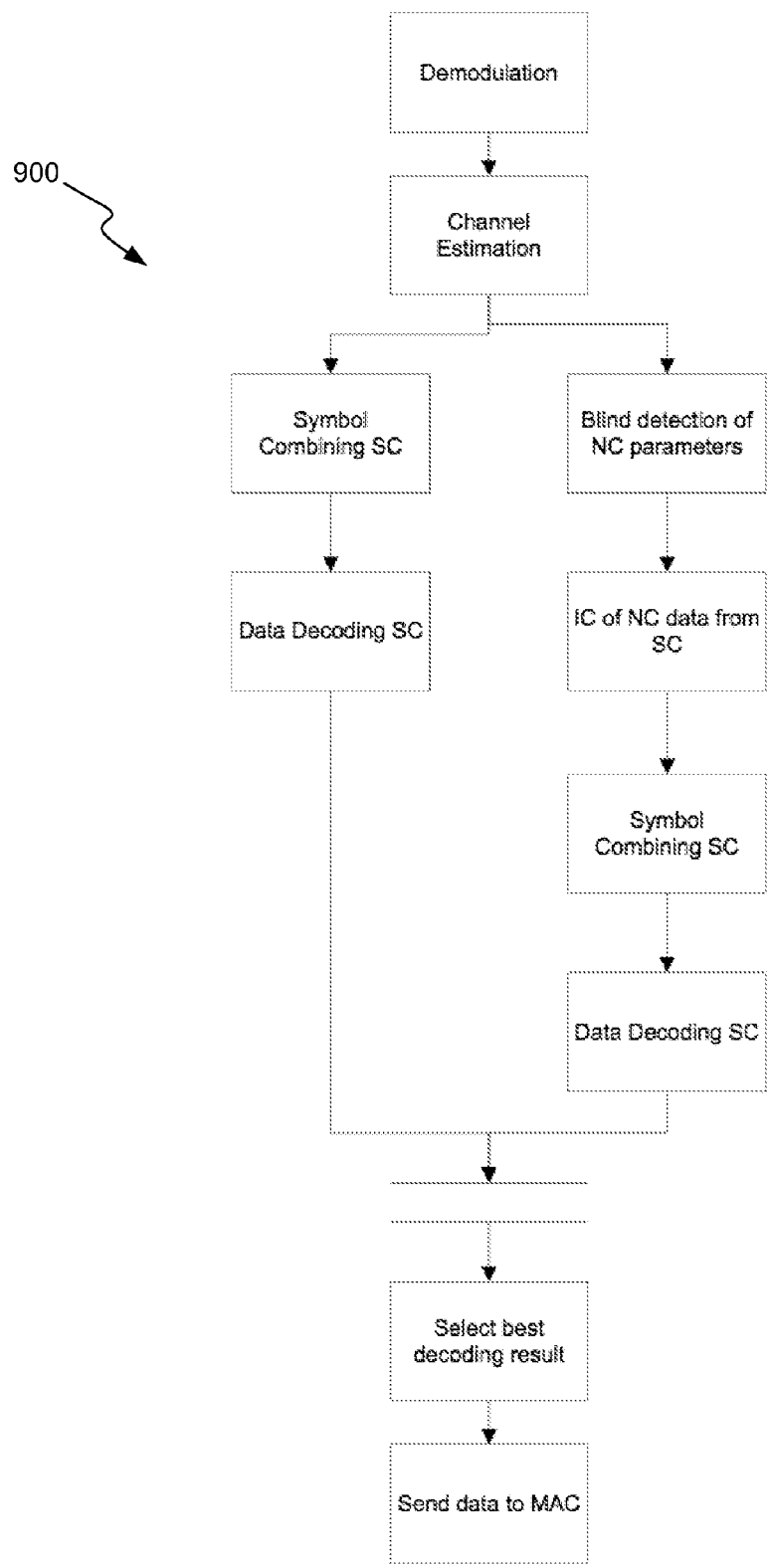
FIGS. 9-12 are logic flow diagrams illustrating further example details for the method introduced in FIG. 8, or variations of that method.
Figure 10:
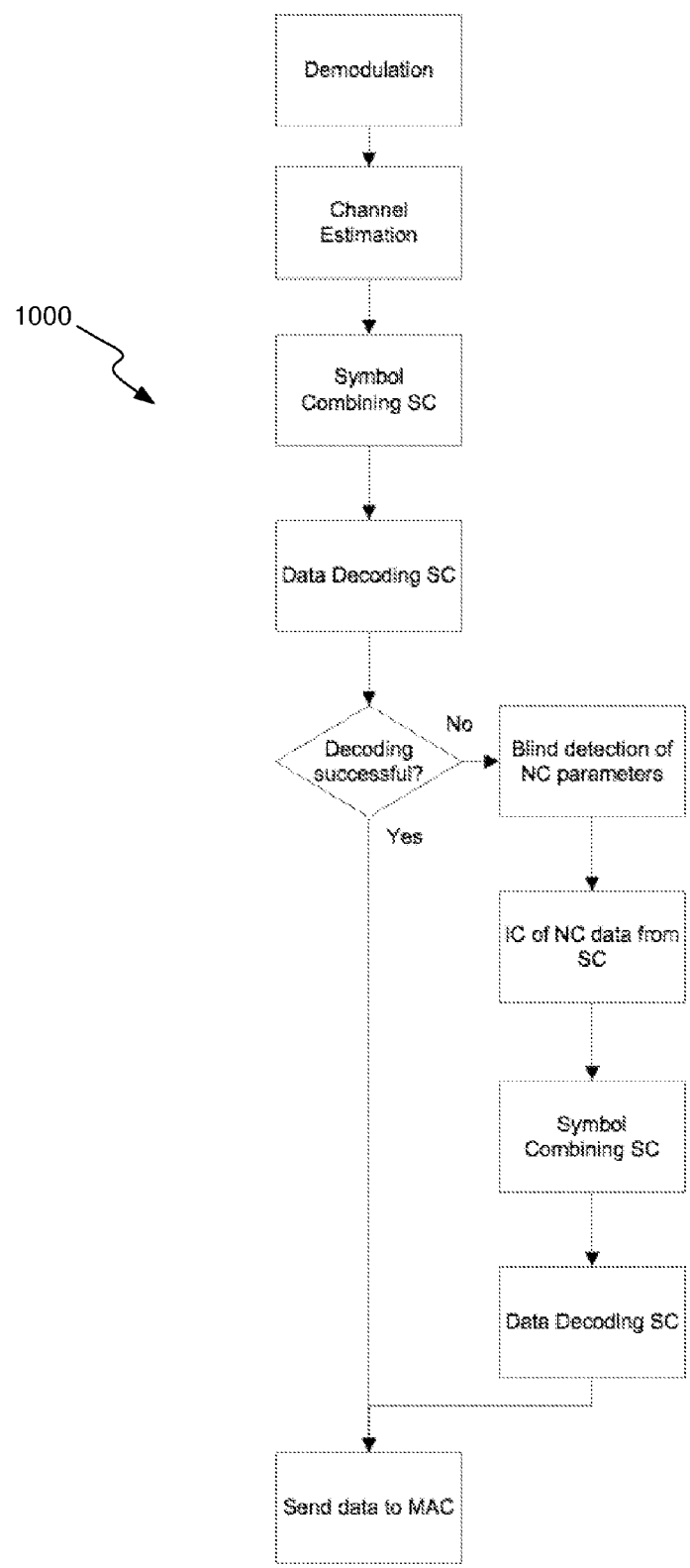

In order to avoid introducing the previously discussed loss from the IC steps when the NC channel parameters are not exactly known, it is proposed herein to use multiple decoding attempts in sequential or parallel fashion as described best by the flow charts in FIGS. 9 and 10. These flow charts can be understood as providing example details for implementing the method 800 and/or for implementing variations of that method. The "best" decoding attempt, defined as the decoding attempt (if any) which produces a correct Cyclic Redundancy Check (CRC) is then further used in the next receiver steps such as MAC and higher layer processing.

Power consumption may be improved in the wireless device 16 (also referred to as a "UE") by running first the baseline decoding attempt and only if the resulting CRC fails then proceeding to use the more complex in IC receiver. The CRC can here span the entire transport block or there may be multiple CRCs per transport block and each CRC covers one code block in the transport block. In the latter case, different code blocks in the same transport block may be decoded using different receiver types, i.e., some code blocks are decoded using the baseline receiver while other code blocks are decoded using a IC receiver (meaning more than one decoding attempt).

Figure 12:
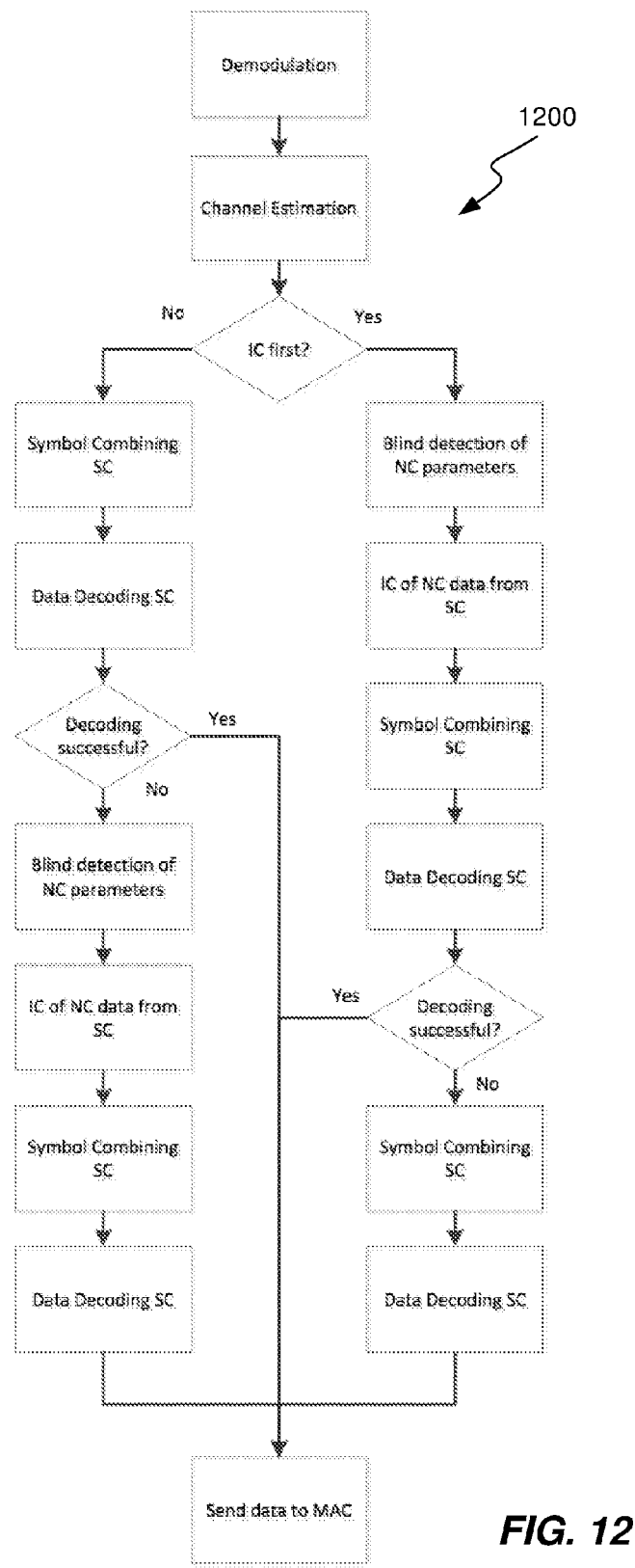

In case the UE can determine whether IC is probably needed to successfully decode the data from the serving cell, it is possible to further reduce the number of decoding attempts by decoding first using IC. This method is shown in FIG. 12.

Interference Cancellation (IC) (i.e., assisted-mode cancellation) is needed when it provides performance gains without which the UE cannot decode a given transmission. For example, IC receivers such as SLIC or ML can outperform receivers such as E-IRC at high SNRs in the presence of low rank and/or low modulation order interference. The UE can determine that these signal properties and conditions are sufficiently probable with a variety of mechanisms. In one approach, the UE can determine the SNR of the serving and neighbour cells, and blindly detect the modulation order and rank of the interferer. If it determines that its blind detection of assistance information is sufficiently reliable, and estimates that the SNR, modulation order, and/or rank of the interferer are such that there will be sufficient IC gain, the UE can decide to perform IC.

Alternatively, because channel and interference conditions can be relatively constant across consecutive subframes, the UE can decide that the first receiver process—assisted mode IC—is probably needed in a current subframe if it is needed in a recent prior subframe. In this alternative, the UE will perform two decodes (one using the first receiver process and one using the second receiver process) once at the beginning of approximately N subframes in order to determine if IC is needed in the remaining N−1 subframes. The UE can also decide that IC is not needed in a first decoding attempt by receiving signalling from the network that indicates that the assistance information provided to it is unreliable and/or that indicates that present network conditions are unfavourable for using the first receiver process.

The above described method when the UE tries to predict which decoding attempt type to start with can also be influenced by the presence/absence of ABS subframes. Such subframes are typically used in heterogeneous deployment where a macro base station incurs strong interference on smaller (having less transmission power) cells. Some of the subframes on the macro may then be blanked (e.g. no shared data and control signals are transmitted) and a UE may be signaled which subframes are blanked according to ABS principles. The decoding attempt type to start with for a transport block may hence depend on whether the transport block was receive in an ABS subframe or not; in an ABS it would make sense for the UE to start with, or at least increase the likelihood of, a IC decoding attempt while in a non-ABS subframe the starting attempt could be the baseline decoding attempt, or at least increase the corresponding likelihood. Increasing the likelihood of a certain decoding attempt type may be performed by adjusting (raising or lowering) detection thresholds.

In some cases, the blind detection procedure may not even be theoretically able to determine which of several parameters is being used by an NC since the parameter is not visible in the blind detection measurement variable. One such example is the used precoder for certain rank and CRS port combinations in LTE when data covariance is used to detect parameters. To remedy this ambiguity, it is possible to make further decoding attempts, each based on one potential set of parameters (hypothesis) from the blind detection, as outlined in the flow chart in FIG. 11.

In some embodiments, baseline receiver performance is guaranteed for each and every Transmission Time Interval (TTI) by running two or more decoding attempts (each resulting in a CRC) on the same transport block where potentially different decoding attempts imply significantly different computational complexity.

Multiple decoding attempts may for example take the form of one attempt with baseline non-IC processed data, another attempt with IC processed data (including soft or hard IC, ML and other suppression methods), and/or potentially more decoding attempts for multiple NC parameter hypotheses. The result of the best decoding attempt is then used in the subsequent steps in the receiver.

A method is thus proposed that has the possibility to guarantees, or reduced the risk, that the IC receiver does not perform worse than the baseline Interference Rejection Combining (IRC) receiver. The method can also be used to improve power consumption in the receiver by running the baseline decoding attempt first and only proceeding to a NAICS receiver decoding attempt if the baseline decoding fails.

Below, some example embodiments are presented. Under a first embodiment the UE is capable of demodulating data by assuming NAICS functionality.

Under the condition of the first embodiment, (a) the UE is capable of performing a multitude of decoding attempts. Under a specific embodiment (i) the UE performs 2 decoding attempts. Under one possible embodiment (1) the, UE implements the 2 decoding attempts in a parallel manner. Under an alternative embodiment (2), the UE implements the 2 decoding attempts in a serial manner, and the UE may (a) be able to decide to perform a decoding attempt using IC prior to or after a decoding attempt not using IC.

Under an alternative embodiment (ii) to the specific embodiment, the UE performs a number of decoding attempts as necessary to resolve potential parameters' ambiguity. Under one possible embodiment (1) the UE implements the multitude of decoding attempts in a parallel manner. Under another embodiment (2) the UE implements the multitude of decoding attempts in a serial manner.

Under the same condition of the first embodiment, (b) the UE can select the "best decoding attempt" as defined in the above text, and use it in the next receiver steps such as MAC and higher layer processing.

As a consequence of the methods and apparatuses disclosed herein, NAICS receiver performance is lower bounded by the legacy Rel-11 baseline receiver, hence a UE capable of NAICS reception guarantees no loss in performance compared to the legacy Rel-11 baseline receiver, and in general it shows a gain when specific favourable NC scheduling conditions are satisfied.

Depending on the embodiment, the methods and apparatuses taught herein allow a UE to reduce power consumption and enable autonomously an NAICS receiver only mode of operation when it is strictly necessary, e.g. when the legacy baseline receiver fails.

The generalization of these teachings to a multitude of decoding attempts allows the contemplated wireless device 16 to resolve the ambiguity related to the estimation of certain parameters such as the precoder (under certain rank conditions).

With the above in mind, FIG. 9 illustrates an embodiment where two decoding attempts are performed in parallel—i.e., where the first and second receiver processes are run in parallel on the received signal.

FIG. 10 illustrates an alternative embodiment where the first receiver process (i.e., the IC operation and corresponding decoding) are only performed if the baseline decoding attempt using the second receiver process fails. This can be used e.g. to reduce power consumption in the receiver.

Figure 11:
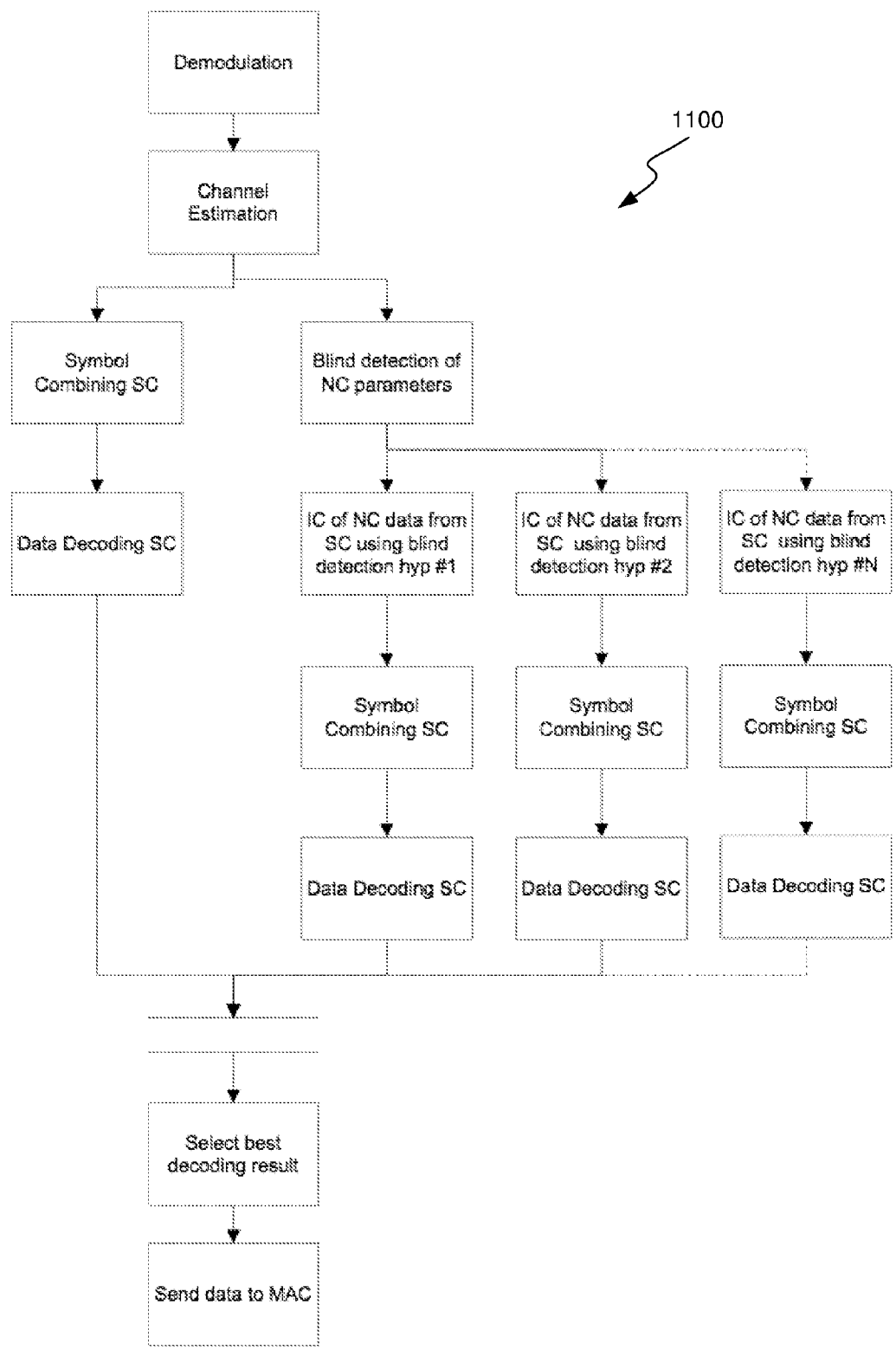

FIG. 11 is a flow chart of one embodiment of the teachings herein where multiple decoding attempts are performed based on multiple NC blind detection hypotheses. That is, the wireless device 16 implements a number of first receiver processes, each such first process corresponding to different hypotheses regarding one or more interfering signals—e.g., different assumptions about the modulation format, transport format, or other interfering-signal parameter.

FIG. 12 is flow chart of an alternative embodiment of the device-side operations contemplated herein, where the wireless device 16 determines if it will use IC in a first decoding attempt, and performs a second decoding attempt using the second receiver process only performed if the first attempt fails. This can be used e.g. to reduce power consumption in the receiver 30-1.

Figure 13:
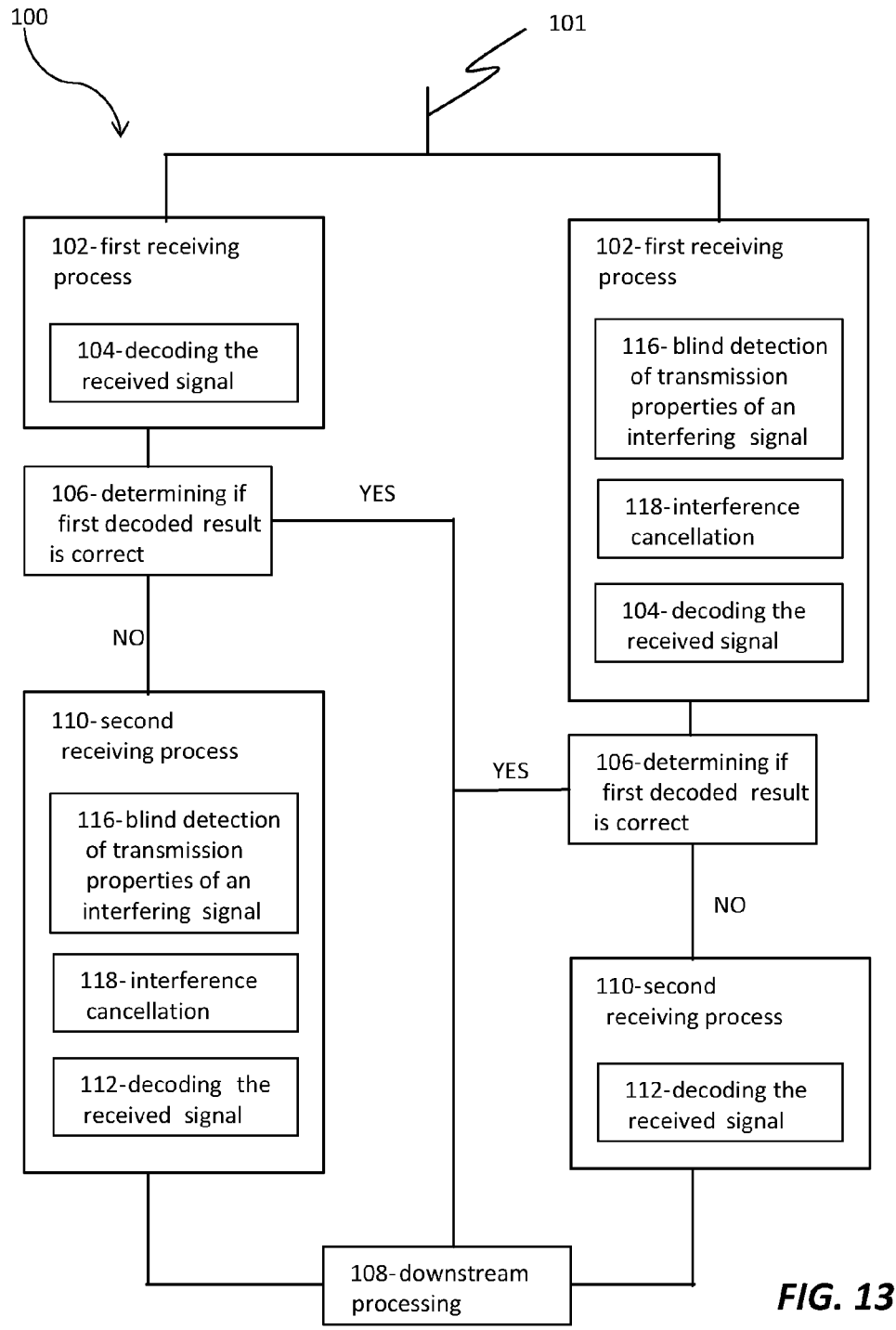
FIG. 13 is a schematic flow diagram illustrating an embodiment of a method decoding a received signal.

FIG. 13 is a flowchart illustrating an embodiment of a method 100 of decoding a received signal 101 at a wireless device operating in a wireless communication network. The method comprises the steps of: performing 102 a first receiving process comprising the sub-step of: performing 104 a decoding of the received signal 101 for providing a first decoded result.

The method 100 further comprises the step of: determining 106 if the first decoded result is correctly decoded. If it is determined 106 that the first decoded result is correctly decoded, the method further comprises: providing 108 the first decoded result for downstream processing.

If it is determined that the first decoded result is not correctly decoded, the method 100 further comprises: performing 110 a second receiving process comprising the sub-steps: performing 112 a decoding of the received signal 101 for providing a second decoded result. The second decoded result is then and provided 108 for downstream processing.

The first receiving process 102 or the second receiving process 110 comprises, prior to performing the decoding the sub-steps of: estimating 116 transmission properties of an interfering signal by blind detection, and performing 118 an interference cancellation from the received signal 101 based on the transmission properties. In FIG. 13, the alternatives are illustrated by the two vertical branches. The left branch corresponds to the blind detection 116 and interference cancellation 118 being performed in the second receiving process 110, and the right branch corresponds to the blind detection 116 and interference cancellation 118 being performed in the first receiving process 102. The left branch of the method 100 in FIG. 13 essentially corresponds to the embodiment described in relation to FIG. 10 above.

Here, and throughout these specifications, determining if the first decoded result is correctly decoded is understood to encompass detecting possible decoding errors in the first decoded result, and if no decoding errors are detected, the first decoded result is considered correctly decoded. Estimating transmission properties of an interfering signal by blind detection means that the wireless device determines the transmission properties from the received signal alone, without any active support from the wireless communication network.

Figure 14:
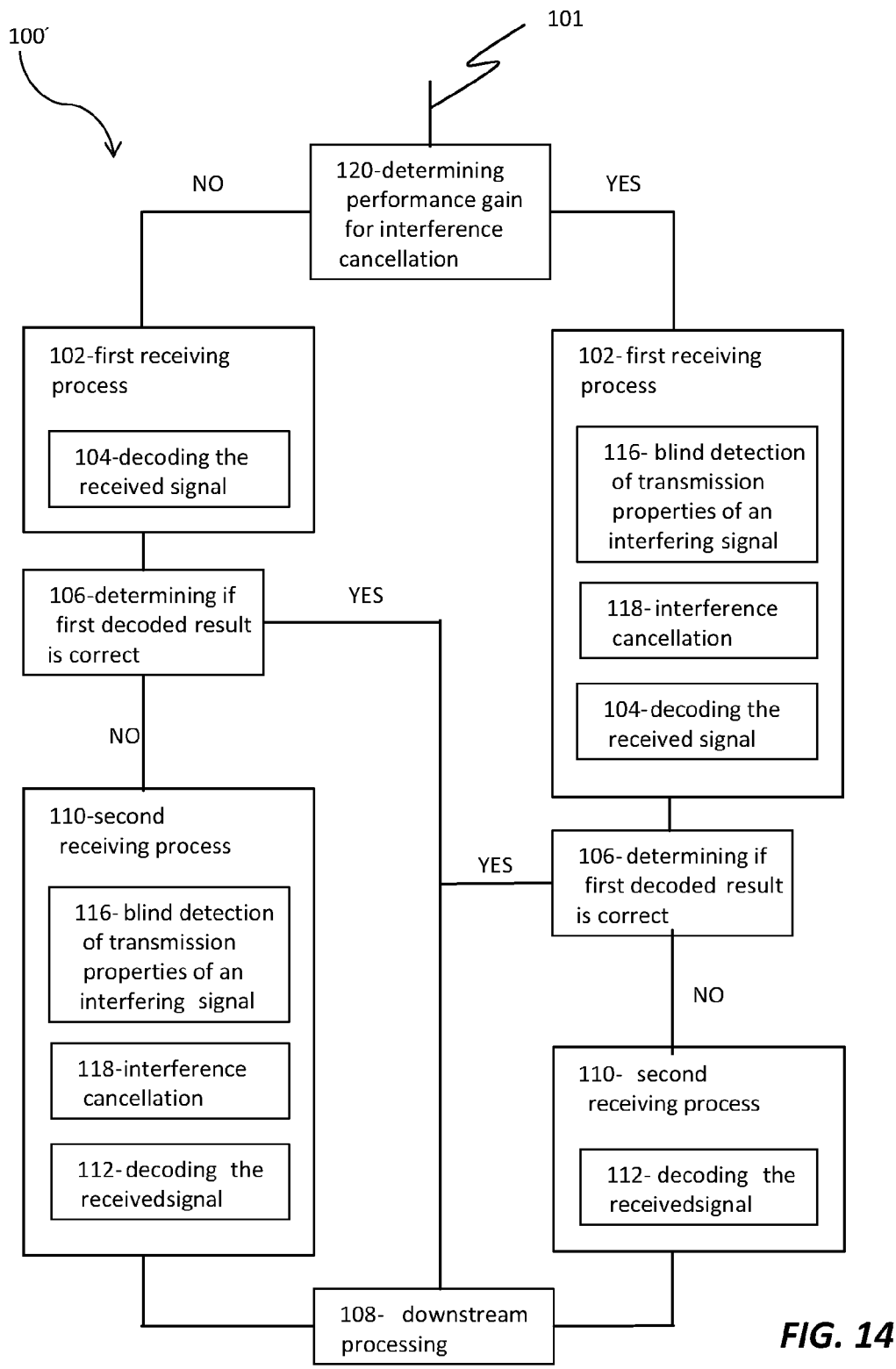
FIG. 14 is a schematic flow diagram illustrating another embodiment of a method decoding a received signal.

FIG. 14 illustrates an alternative embodiment of a method 100' of decoding a received signal 101. All the features of the method described in relation to FIG. 13 are present. Additionally, the method comprises the step of determining 120 if the interference cancellation is to be performed in the first receiving process. This step is performed prior to performing the first receiving process 102. The determining 120 if the interference cancellation is to be performed in the first receiving process may be based on an expected performance gain of the interference cancellation. This embodiment shares several features with the embodiment described above in relation FIG. 12.

Additionally or alternatively, the determining 120 if the interference cancellation is to be performed in the first receiving process may be based on a blind detection of the modulation order and/or the rank of the interferer. The determining 120 if the interference cancellation is to be performed in the first receiving process may, additionally or alternatively, be based on the signal-to-noise ratio of the serving cell and/or the interfering cell. Embodiments with these features overlap with the above described approach, in which, the UE can determine the SNR of the serving and neighbour cells, and blindly detect the modulation order and rank of the interferer. Further, if the UE determines that its blind detection is sufficiently reliable, the UE can decide to perform IC first Additionally or alternatively, if the signal is received within a subframe of a plurality of consecutive subframes, the interference cancellation may be performed in the first receiving process if interference cancellation has been performed in the previous subframe. Here, a further possible restriction may be that the interference cancellation has been successfully performed in the previous subframe. Embodiments with these features overlaps with the above described approach, in which the UE performs two decodings, one with IC and one without, at the beginning of N subframes in order to determine if IC is needed the remaining N–1 subframes.

If the signal carries a transport block, the method described in relation to FIG. 14 and any of the alternatives above may further comprise, prior to performing the first receiving process: determining 120 if the transport block was received in an almost blank subframe or not, and determining 120 if the interference cancellation is to be performed in the first receiving process based on the outcome. If it is determined that the transport block was received in an almost blank subframe, the interference cancellation may be performed in the first receiving process. Embodiments with these features overlaps with the above described approach, in which the UE decision which decoding attempt type to start with is influenced by the presence/absence of ABS subframes. Here, a transport block is understood to encompass a transport block generated from higher layer data packets by multiplexing, and that is transmitted in the physical layer. For example, in LTE, one transport block, or up to two for the case of Multiple Input Multiple Output (MIMO) multiplexing may be transmitted in a transmission time interval of 1 ms.

The method described in relation to FIG. 14 and any of the alternatives above may further comprise, prior to performing the first receiving process: receiving 120 assistance information of an interfering signal, and determining 120 if the interference cancellation is to be performed in the first receiving process be based on the assistance information. Embodiments with these features overlaps with the above described approach, in which the UE decides that IC is not needed in a first decoding attempt by receiving signaling from the network indicating that the assistance information provided is unreliable and/or that present network conditions are unfavorable for NAICS reception.

Figure 15:
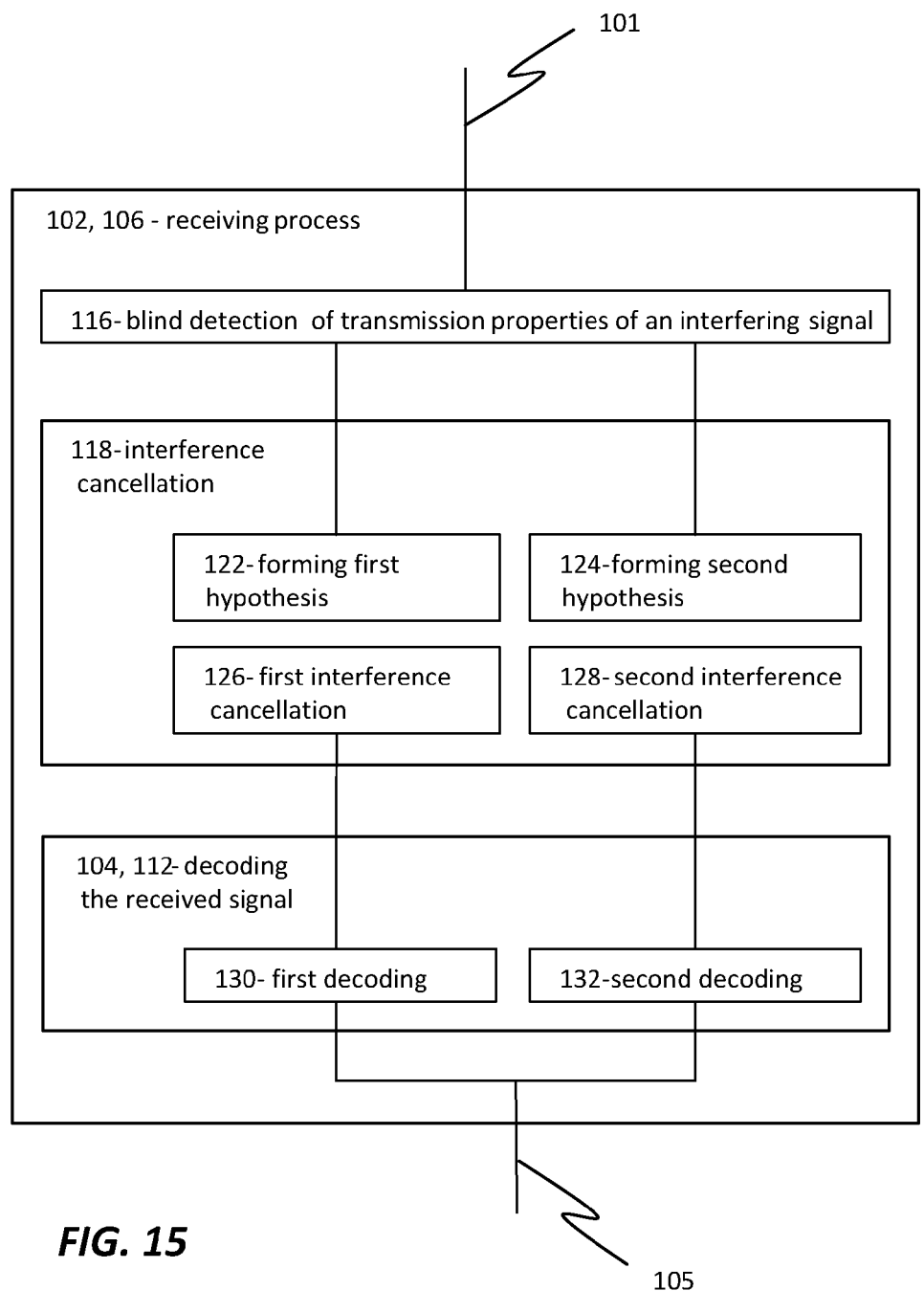
FIG. 15 is a schematic flow diagram illustrating a receiving process in a method decoding a received signal.

FIG. 15 illustrates a first receiving process 102 or a second receiving process 110 that can be employed in any of the embodiments described in relations to FIGS. 13 and 14. The receiving process 102 or 110 establishes a first hypothesis 122 and a second hypothesis 124 for an interfering-signal.

The interference cancellation 118 comprises: a first interference cancellation 126 based on the first hypothesis 122 and a second interference cancellation 128 based on the second hypothesis 124. The decoding 104 or 112 of the received signal comprises a first decoding 130 based on the first interference cancellation 126 and a second decoding 132 based on the second interference cancellation 128. The decoded result of the receiving process 102 or 110 is then based or formed from the first decoding 130, the second decoding 132, or combination thereof.

The receiving processes 102 and 110 described here shares many of the features of the embodiment described above in relation to FIG. 11.

Figure 16:
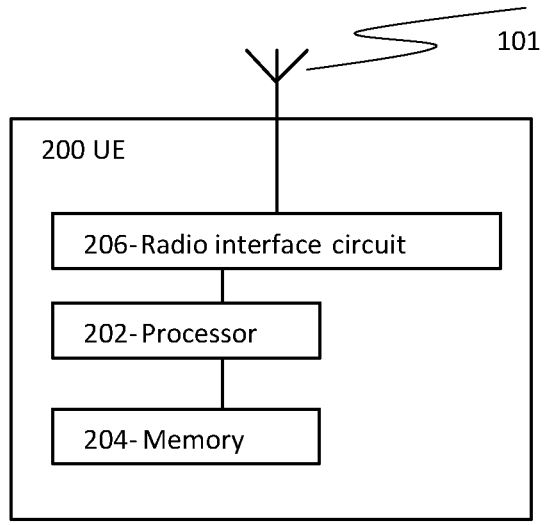
FIG. 16 is a schematic illustration of an embodiment of a wireless device for decoding a received signal.

FIG. 16 illustrates an embodiment of a wireless device 200 configured to receive a signal in a wireless communication network. The wireless device is configured to perform a first receiving process. The first receiving process comprises a performing of a decoding of the received signal for providing a first decoded result. The wireless device is further configured to determine if the first decoded result is correctly decoded, and to provide the first decoded result for downstream processing if it is determined that the first decoded result is correctly decoded.

Otherwise, the wireless device performs a second receiving process. The second receiving process comprises a performing of a decoding of the received signal for providing a second decoded result, and provides the second decoded result for downstream processing. The first receiving process or the second receiving process is further configured to, prior to performing the decoding, estimate transmission properties of an interfering signal by blind detection, and to perform an interference cancellation from the received signal based on the transmission properties.

The wireless device may further be configured to, prior to performing the first receiving process, determine if the interference cancellation is to be performed in the first receiving process based on an expected performance gain of the interference cancellation.

Additionally or alternatively, the wireless device may further be configured to, prior to performing the first receiving process, determine if the interference cancellation is to be performed in the first receiving process based on a blind detection of the modulation order and/or the rank of the interferer. The wireless device may further be configured to, prior to performing the first receiving process, determine if the interference cancellation is to be performed in the first receiving process based on the signal-to-noise ratio of the serving cell and/or the interfering cell.

The signal may be received within a subframe of a plurality of consecutive subframes, and the interference cancellation may be performed in the first receiving process if interference cancellation has been performed in the previous subframe. In one alternative, the interference cancellation in the previous subframe has been successful. The signal may carry a transport block, and the wireless device may further be configured to, prior to performing the first receiving process, determine if the transport block was received in an almost blank subframe or not. The determining if the interference cancellation is to be performed in the first receiving process may then be based on the outcome.

Alternatively or additionally, the wireless device may further be configured to, prior to performing the first receiving process, receive assistance information of an interfering signal, and to determine if the interference cancellation is to be performed in the first receiving process based on the assistance information.

In any of the above alternative embodiments of the wireless device, the first or second receiving process performing the interference cancellation may further be configured to establish a first hypothesis and a second hypothesis for an interfering-signal. Further, the interference cancellation may comprise a first interference cancellation based on the first hypothesis and a second interference cancellation based on the second hypothesis, and the decoding of the received signal may comprise a first decoding based on the first interference cancellation and a second decoding based on the second interference cancellation. The decoded result of the receiving process may then be based on the result of the first decoding, the second decoding, or combination thereof.

In one embodiment of the wireless device or UE 200 shown in FIG. 16, the wireless device 200 comprises a processor 202, a memory 204, and a radio interface circuit 206 configured to receive a signal from a wireless communication network. The memory 204 contains instructions executable by the processor 202, whereby the wireless device 200 is operative to (i) perform a first receiving process comprising performing a decoding of the received signal for providing a first decoded result. The wireless device 200 is further operative to determine if the first decoded result is correctly decoded, and to provide the first decoded result for downstream processing if it is determined that the first decoded result is correctly decoded. Otherwise, the wireless device 200 is further operative to perform a second receiving process comprising performing a decoding of the received signal for providing a second decoded result. The wireless device 200 is further operative to provide the second decoded result for downstream processing. The first receiving process or the second receiving process are further configured to, prior to performing the decoding, estimate transmission properties of an interfering signal by blind detection, and perform an interference cancellation from the received signal based on the transmission properties. The wireless device may further be operative to perform any of the steps or include any of the features of the method embodiments described in relation to FIGS. 13 and 14.

In one embodiment, a computer program is provided comprising program instructions that, when executed by a processing circuit 202 of a wireless device 200 configured to operate in a wireless communication network, configures the processing circuit 202 to decode the received signal. The computer program comprising program instructions causing the processing circuit 202 to perform the steps described above in relations to FIGS. 13-15.

In another, a computer-readable medium is provided storing a computer program comprising program instructions that, when executed by a processing circuit 202 of a wireless device 200 configured to operate in a wireless communication network, configures the processing circuit 202 to decode a received signal. The computer program comprising program instructions causing the processing circuit 202 to perform the steps described above in relations to FIGS. 13-15. The computer-readable medium may be a non-transitory memory.

Figure 17:
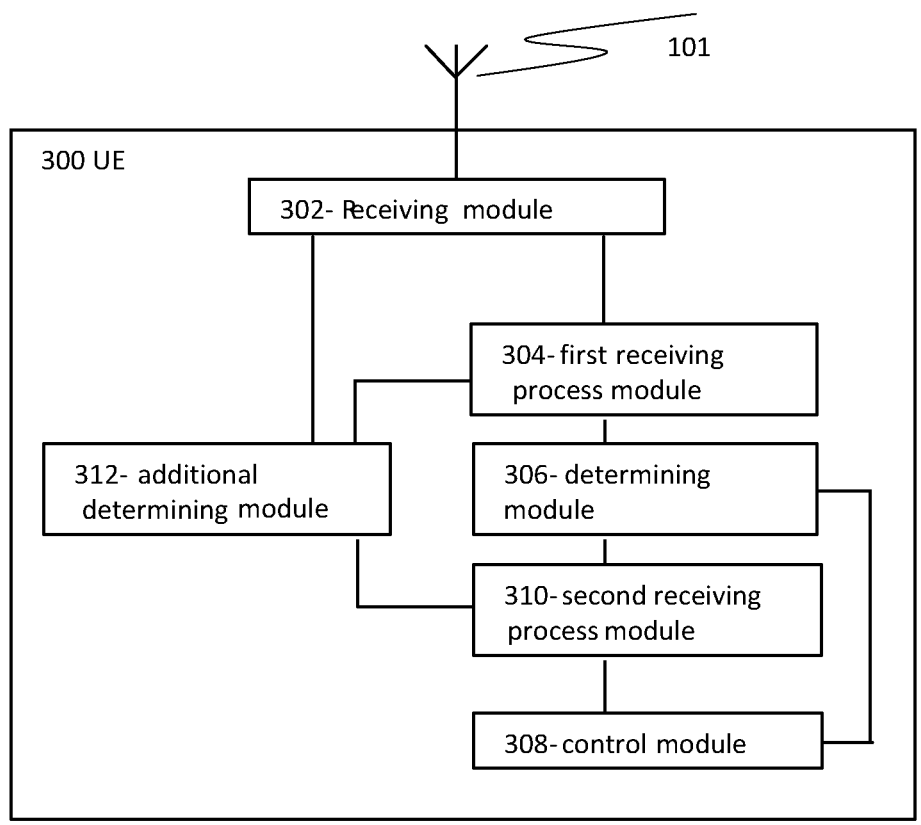
FIG. 17 is a schematic illustration of another embodiment of a wireless device for decoding a received signal.

FIG. 17 illustrates an alternative embodiment of a wireless device 300. The wireless device 300 comprises a receiving module 302 adapted to receive a signal from a wireless communication network. The wireless device 300 further comprises a first receiving process module 304 adapted to perform a decoding of the received signal for providing a first decoded result, and a determining module 306 adapted to determine if the first decoded result is correctly decoded. The wireless device 300 further has a control module 308 adapted to provide the first decoded result for downstream processing if it is determined that the first decoded result is correctly decoded. The wireless device 300 also has a second receiving process module 310 adapted to perform a decoding of the received signal if it is determined that the first decoded result is not correctly decoded for providing a second decoded result. The control module 308 is further adapted to provide the second decoded result for downstream processing.

The first receiving process module 304 and the second receiving process module 310 are further adapted to estimate transmission properties of an interfering signal by blind detection, and perform an interference cancellation from the received signal based on the transmission properties. The wireless device 300 further comprises an additional determining module 312 adapted to determine if the interference cancellation is to be performed by the first receiving process module 304 or the second receiving process module 310 based on the transmission properties.

The presented technology relates to a method for transmitting channel quality indicators, the method being performed in a wireless device served by a first radio network node of a wireless communication network. The wireless device receives a reference signal from the first radio network node and information relating to an interfering transmission of a second radio network node. It estimates a first channel quality based on the reference signal, and a second channel quality based on the reference signal and on the information relating to the interfering transmission, wherein the second channel quality indicates a channel quality for which the interfering transmission has been cancelled. Corresponding first and second channel quality indicators are determined and transmitted to the first radio network node.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Additional example embodiments are presented below. In a first example embodiment, a method of decoding a received signal at a wireless device operating in a wireless communication network is provided, said method comprising: obtaining first decoding results by processing a received signal using a first receiver process that cancels interference in the received signal based on knowledge of interfering-signal transmission properties, said knowledge represented by assistance information received from the network and/or blindly estimated by the wireless device; obtaining second decoding results by processing the received signal using a second receiver process that does not cancel interference in the received signal based on said knowledge of interfering-signal transmission properties and thereby establishes a performance baseline for evaluating a decoding performance of the first receiver process; forming final decoding results as any one of the first decoding results, the second decoding results, or a combination of the first and second decoding results, and thereby guaranteeing that the final decoding results at least meet the performance baseline; and providing the final decoding results for downstream received-signal processing.

The method of the first example embodiment, wherein obtaining the first decoding results comprises processing the received signal in a first receiver circuit that is configured to carry out the first receiver process, and wherein obtaining the second decoding results comprises processing the received signal in a second receiver circuit that is configured to carry out the second receiver process. The method of the above embodiment, wherein each receiver process includes received symbol detection and channel estimation operations.

The method of the above embodiments relating to the first example embodiment, wherein the first receiver process includes obtaining the assistance information at least partly based on blindly estimating one or more of the interfering-signal transmission properties used for interference cancellation.

The method of the above embodiments relating to the first example embodiment, wherein the first receiver process comprises a plurality of first receiver processes that are performed in series or parallel, where each first receiver process produces a first decoding result set and corresponds to a different hypothesis for the interfering-signal transmission properties, and wherein forming the final decoding results comprises selecting the final decoding results as any one of: the second decoding results, any one of the first decoding result sets, any mix of the first decoding result sets, and any mix of the second decoding results and any one or more of first decoding result sets.

The method of the above embodiments relating to the first example embodiment, wherein the first decoding results comprise first decoded data values, the second decoding results comprise second decoded data values, and wherein any one of the following applies: the first decoding results are taken as the final decoding results if no decoding errors are detected for the first decoding results; the second decoding results are taken as the final decoding results if no decoding errors are detected for the second decoding results; or correctly-decoded results from the first and second decoding results are aggregated to form the final decoding results.

The method of the above embodiments relating to the first example embodiment, further comprising dynamically changing the wireless device between a first mode of operation wherein it performs any of the steps set forth in embodiments 1-6, and a second mode of operation wherein it does not perform the first receiver process or otherwise does not use the first decoding results, such that the final decoding results are the second decoding results. The method of the above embodiment further comprising choosing between the first mode and the second mode based on any one or more of the following: control signaling received from the network, the presence or absence of Almost Blank Subframes (ABS) in the received signal, whether or not the network provides one or more elements of the assistance information which are considered as being critical assistance parameters, the ability to blindly estimate sufficient assistance information and/or the availability of sufficient assistance information from the network, received signal quality and/or strength, interference power, the presence or absence of one or more dominant interfering signals in the received signal, and reception and/or transmission modes.

In a second example embodiment, a wireless device configured for operation in a wireless communication network is provided, said wireless device comprising: a communication transceiver comprising a receiver configured to receive signals from the wireless communication network and a transmitter configured to transmit signals to the wireless communication network; and wherein the receiver comprises: a first receiver circuit configured to obtain first decoding results by decoding a received signal using a first receiver process that cancels interference in the received signal based on knowledge of interfering-signal transmission properties, said knowledge represented by assistance information received from the network and/or blindly estimated by the wireless device; a second receiver circuit configured to obtain second decoding results by decoding the received signal using a second receiver process that does not cancel interference in the received signal based on said knowledge of interfering-signal transmission properties and thereby establishes a performance baseline for evaluating a decoding performance of the first receiver process; and a control circuit configured to: guarantee that final decoding results at least meet the performance baseline, based on forming the final decoding results as any one of: the first decoding results, the second decoding results, or a combination of the first and second decoding results; and provide the final decoding results for downstream received-signal processing.

The wireless device of embodiment of the second example embodiment, wherein the control circuit and at least a portion of the first and second receiver circuits are comprised in a processing circuit, such as a Digital Signal Processor (DSP).

The wireless device of the above embodiments relating to the second example embodiment, wherein the receiver is configured as a multi-antenna receiver, and wherein the processing circuit is a baseband processing circuit coupled to two or more receiver front-end circuits, each front-end circuit corresponding to a different receiver antenna.

The wireless device of the above embodiments relating to the second example embodiment further comprising a downstream processing circuit configured to further process the final decoding results.

The wireless device of the above embodiments relating to the second example embodiment, wherein the wireless device is configured to perform processing corresponding to any of the above embodiments relating to the method of the first example embodiment.

In a third example embodiment, a computer-readable medium is provided storing a computer program comprising program instructions that, when executed by a processing circuit of a wireless device configured for operation in a wireless communication network, configures the processing circuit to decode a received signal, said computer program comprising program instructions to: obtain first decoding results by processing a received signal using a first receiver process that cancels interference in the received signal based on knowledge of interfering-signal transmission properties, said knowledge represented by assistance information received from the network and/or blindly estimated by the wireless device; obtain second decoding results by processing the received signal using a second receiver process that does not cancel interference in the received signal based on said knowledge of interfering-signal transmission properties and thereby establishes a performance baseline for evaluating a decoding performance of the first receiver process; form final decoding results as any one of the first decoding results, the second decoding results, or a combination of the first and second decoding results, and thereby guaranteeing that the final decoding results at least meet the performance baseline; and provide the final decoding results for downstream received-signal processing.

In a fourth example embodiment, a method of decoding a received signal at a wireless device operating in a wireless communication network is provided, said method comprising: obtaining first decoding results using a first receiver process to obtain first decoding results for a received signal, wherein said first receiver process uses assistance information to perform interference cancellation; obtaining second decoding results using a second receiver process that does not use the assistance information, to obtain second decoding results for the received signal, wherein the second receiver process establishes a performance baseline for evaluating a decoding performance of the first receiver process; and forming final decoding results as any one of the first decoding results, the second decoding results, or a combination of the first and second decoding results, and thereby guaranteeing that the final decoding results at least meet the performance baseline.

In a fifth example embodiment, a computer-readable medium is provided storing a computer program comprising program instructions that, when executed by a processing circuit of a wireless device configured for operation in a wireless communication network, configures the processing circuit to decode a received signal, said computer program comprising program instructions to: obtain first decoding results using a first receiver process to obtain first decoding results for a received signal, wherein said first receiver process uses assistance information to perform interference cancellation; obtain second decoding results using a second receiver process that does not use the assistance information, to obtain second decoding results for the received signal, wherein the second receiver process establishes a performance baseline for evaluating a decoding performance of the first receiver process; and form final decoding results as any one of the first decoding results, the second decoding results, or a combination of the first and second decoding results, and thereby guaranteeing that the final decoding results at least meet the performance baseline.

In a fifth example embodiment, a wireless device configured for operation in a wireless communication network is provided, said wireless device comprising: a first obtaining unit for obtaining first decoding results using a first receiver process to obtain first decoding results for a received signal, wherein said first receiver process uses assistance information to perform interference cancellation; a second obtaining unit for obtaining second decoding results using a second receiver process that does not use the assistance information, to obtain second decoding results for the received signal, wherein the second receiver process establishes a performance baseline for evaluating a decoding performance of the first receiver process; and a controlling unit for forming final decoding results as any one of the first decoding results, the second decoding results, or a combination of the first and second decoding results, and thereby guaranteeing that the final decoding results at least meet the performance baseline.

The invention claimed is:

1. A method of decoding a received signal at a wireless device operating in a wireless communication network, the method comprises:
performing a first receiving process comprising performing a decoding of the received signal for providing a first decoded result;
determining if the first decoded result is correctly decoded; and
if it is determined that the first decoded result is correctly decoded, the method further comprises providing the first decoded result for downstream processing; and
if it is determined that the first decoded result is not correctly decoded, the method further comprises:
performing a second receiving process comprising performing a decoding of the received signal for providing a second decoded result; and
providing the second decoded result for downstream processing;
wherein the first receiving process or the second receiving process comprises, prior to performing the respective decoding:
estimating transmission properties of an interfering signal by blind detection; and performing an interference cancellation from the received signal based on the estimated transmission properties;
wherein performing the interference cancellation in the first or second receiving process comprises establishing a first hypothesis and a second hypothesis for the interfering signal, wherein the interference cancellation comprises a first interference cancellation based on the first hypothesis and a second interference cancellation based on the second hypothesis, and the decoding of the received signal comprises a first decoding based on the first interference cancellation and a second decoding based on the second interference cancellation; and
wherein the decoded result of the receiving process is based on the result of the first decoding, the second decoding, or a combination thereof.

2. The method according to claim 1, further comprising, prior to performing the first receiving process:
determining if the interference cancellation is to be performed in the first receiving process based on an expected performance gain of the interference cancellation.

3. The method according to claim 1, further comprising, prior to performing the first receiving process:
determining if the interference cancellation is to be performed in the first receiving process based on a blind detection of a modulation order and/or a rank of the interfering signal.

4. The method according to claim 1, further comprising, prior to performing the first receiving process:
determining if the interference cancellation is to be performed in the first receiving process based on a signal-to-noise ratio of a serving cell to which the wireless device is attached and/or an interfering cell associated with the interfering signal.

5. The method according to claim 1, wherein the received signal is received within a subframe of a plurality of consecutive subframes, and the interference cancellation is performed in the first receiving process if interference cancellation has been performed in the previous subframe.

6. The method according to claim 1, wherein the received signal carries a transport block and the method further comprising, prior to performing the first receiving process:
determining whether the interference cancellation is to be performed in the first receiving process in dependence on whether the transport block was received in an almost blank subframe.

7. The method according to claim 1, further comprising, prior to performing the first receiving process:
receiving assistance information of the interfering signal, and determining if the interference cancellation is to be performed in the first receiving process based on the assistance information.

8. A wireless device configured to operate and receive a signal in a wireless communication network, comprising:
receiving circuitry configured to receive the signal; and
processing circuitry operatively associated with the receiving circuitry and configured to:
perform a first receiving process comprising performing a decoding of the received signal for providing a first decoded result;
determine if the first decoded result is correctly decoded;
provide the first decoded result for downstream processing if it is determined that the first decoded result is correctly decoded; and
otherwise:
perform a second receiving process comprising performing a decoding of the received signal for providing a second decoded result; and
provide the second decoded result for downstream processing;
wherein the first receiving process or the second receiving process comprises, prior to performing the respective decoding:
estimating transmission properties of an interfering signal by blind detection; and
performing an interference cancellation from the received signal based on the transmission properties;
wherein the processing circuitry is further configured to:
establish a first hypothesis and a second hypothesis for the interfering signal, wherein the interference cancellation comprises a first interference cancellation based on the first hypothesis and a second interference cancellation based on the second hypothesis, and the decoding of the received signal comprises a first decoding based on the first interference cancellation and a second decoding based on the second interference cancellation; and
wherein the decoded result of the receiving process is based on the result of the first decoding, the second decoding, or a combination thereof.

9. The wireless device according to claim 8, wherein the processing circuitry is configured to, prior to performing the first receiving process:
determine if the interference cancellation is to be performed in the first receiving process based on an expected performance gain of the interference cancellation.

10. The wireless device according to claim 8, wherein the processing circuitry is configured to, prior to performing the first receiving process:
determine if the interference cancellation is to be performed in the first receiving process based on a blind detection of a modulation order and/or a rank of the interfering signal.

11. The wireless device according to claim 8, wherein the processing circuitry is configured to, prior to performing the first receiving process:
determine if the interference cancellation is to be performed in the first receiving process based on a signal-to-noise ratio of a serving cell to which the wireless device is attached and/or an interfering cell associated with the interfering signal.

12. The wireless device according to claim 8, wherein the received signal is received within a subframe of a plurality of consecutive subframes, and the interference cancellation is performed in the first receiving process if interference cancellation has been performed in the previous subframe.

13. The wireless device according to claim 8, wherein the received signal carries a transport block, and the processing circuitry is configured to, prior to performing the first receiving process:
determine whether the interference cancellation is to be performed in the first receiving process in dependence on whether the transport block was received in an almost blank subframe.

14. The wireless device according to claim 8, wherein the processing circuitry is configured to, prior to performing the decoding:
receive assistance information of the interfering signal; and perform the interference cancellation from the received signal further based on the assistance information.

15. The wireless device according to claim 8, wherein the processing circuitry is configured to, prior to performing the first receiving process:
receive assistance information of the interfering signal; and
determine if the interference cancellation is to be performed in the first receiving process based on the assistance information.

16. A non-transitory computer-readable medium storing a computer program comprising program instructions that, when executed by a processing circuit of a wireless device configured to operate in a wireless communication network, configures the processing circuit to decode a received signal, the computer program comprising program instructions for causing the processing circuit to:
perform a first receiving process comprising performing a decoding of the received signal for providing a first decoded result;
determine if the first decoded result is correctly decoded; and
if it is determined that the first decoded result is correctly decoded, the processing circuit is further caused to provide the first decoded result for downstream processing; and
if it is determined that the first decoded result is not correctly decoded, the processing circuit is further caused to:
perform a second receiving process comprising performing a decoding of the received signal for providing a second decoded result; and
provide the second decoded result for downstream processing;
wherein the first receiving process or the second receiving process comprises, prior to performing the decoding:
estimating transmission properties of an interfering signal by blind detection; and
performing an interference cancellation from the received signal based on the estimated transmission properties; and
wherein the computer program further comprises instructions for causing the processing circuit to:
establish a first hypothesis and a second hypothesis for the interfering signal, wherein the interference cancellation comprises a first interference cancellation based on the first hypothesis and a second interference cancellation based on the second hypothesis, and the decoding of the received signal comprises a first decoding based on the first interference cancellation and a second decoding based on the second interference cancellation; and
wherein the decoded result of the receiving process is based on the result of the first decoding, the second decoding, or combination thereof.

* * * * *